United States Patent
Kawamura et al.

(10) Patent No.: US 6,274,006 B1
(45) Date of Patent: Aug. 14, 2001

(54) APPARATUS AND METHOD FOR TREATING EXHAUST GAS AND PULSE GENERATOR USED THEREFOR

(75) Inventors: Keisuke Kawamura; Tetsuro Shigemizu; Hirohisa Yoshida; Masayoshi Murata, all of Nagasaki-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/369,843

(22) Filed: Aug. 9, 1999

Related U.S. Application Data

(62) Division of application No. 08/825,913, filed on Apr. 2, 1997, now Pat. No. 6,007,681.

(30) Foreign Application Priority Data

Apr. 4, 1996 (JP) ..................................... 8-82284
Jul. 25, 1996 (JP) ................................... 8-196311
Nov. 11, 1996 (JP) ................................. 8-298326

(51) Int. Cl.[7] ................................................. B01J 19/08
(52) U.S. Cl. ............................................................ 204/164
(58) Field of Search ................................. 204/164–179; 422/186–186.3, 906, 907

(56) References Cited

U.S. PATENT DOCUMENTS 4,695,358   9/1987   Mizuno et al. ...................... 204/174
5,411,713 * 5/1995   Iwanaga et al. ................. 422/186.07

FOREIGN PATENT DOCUMENTS 62-289249   12/1987   (JP).

OTHER PUBLICATIONS

A. Mizuno et al., A Device for the Removal of Sulfur Dioxide From Exhaust Gas by Pulsed Energization of Free Electrons, Physics Dept, Florida State Univ. Tallahassee, FL, pp. 1015–1017, 1984. (No Month Available).

* cited by examiner

Primary Examiner—Kishor Mayekar
(74) Attorney, Agent, or Firm—Foley & Lardner

(57) ABSTRACT

An apparatus and method for treating exhaust gases. A plurality of stages of reactor chambers are connected in series in the direction of an exhaust gas flow. High-voltage power supplies are connected to the reactor chambers In each of these reactor chambers, a streamer discharger plasma is generated. The more downstream a reactor chamber of a stage is placed, the lower energy to be cast into the reactor chamber becomes. The density of electrons generated in a gas decomposition unit is higher on the upstream side of the exhaust gas flow and the electron density is lower on the downstream side. A pulse generator is provided in which a high voltage, which is an output voltage of a D.C. charger ($V_0$), is simultaneously applied to a plurality of distributed constant lines, which are connected in parallel with one another, by a signal shortcircuit switch ($S_1$).

2 Claims, 22 Drawing Sheets

FIG. 18a (RELATED ART)
VOLTAGE WAVES TRAVELING IN DISTRIBUTED PARAMETER LINE 1-1
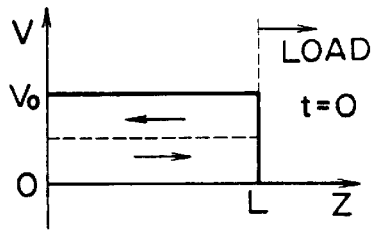
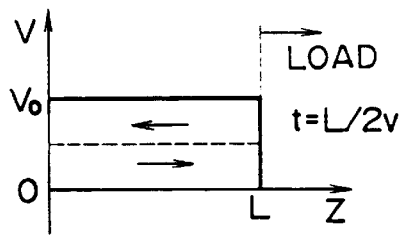
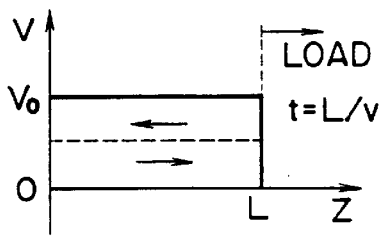
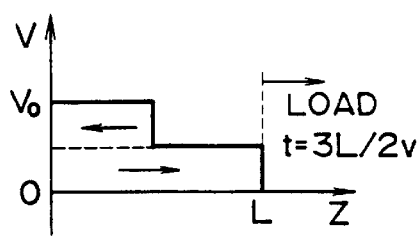
FIG. 18b (RELATED ART)
VOLTAGE WAVES TRAVELING IN DISTRIBUTED PARAMETER LINE 1-2
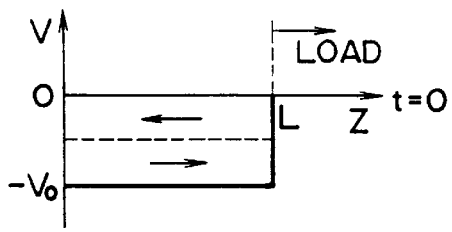
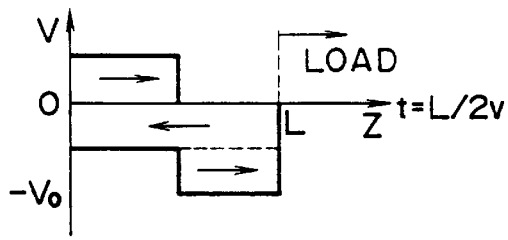
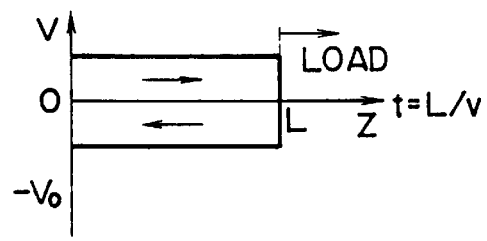
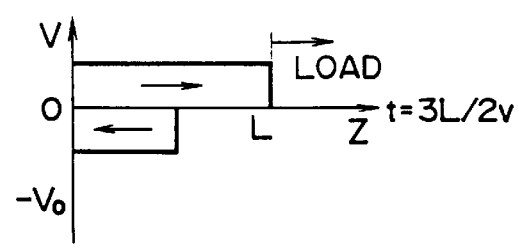
FIG. 18c (RELATED ART)
OUTPUT VOLTAGE WAVEFORM
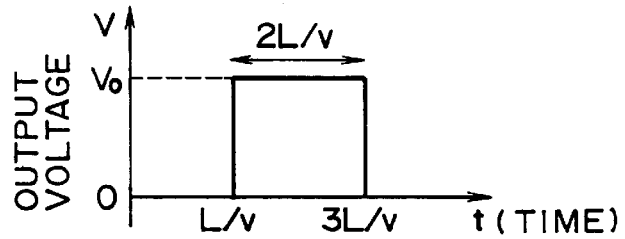

US 6,274,006 B1

APPARATUS AND METHOD FOR TREATING EXHAUST GAS AND PULSE GENERATOR USED THEREFOR

This application is a divisional of application Ser. No. 08/825,913, filed Apr. 2, 1997 now U.S. Pat. No. 6,007,681.

BACKGROUND OF THE INVENTION

1. Field of the Invention

The present invention generally relates to an apparatus and method for treating toxic or hazardous substances, such as $NO_x$ and $SO_x$ or the like, contained in exhaust or flue gases of, for example, a thermal (electric) power plant, a garbage burning facility (namely, a refuse incinerating facility), a toxic substance treating facility and a car by using a streamer discharge plasma. More particularly, the present invention relates to a streamer discharge plasma treatment apparatus and method for decomposing and detoxifying nitrogen oxides (hereunder described as $NO_x$) and sulfur oxides (hereunder described as $SO_x$) contained in exhaust or flue gases of a thermal power plant and so forth. Further, the present invention is applied to the decomposition and detoxification of VOC (namely, Volatile Organic Compound) gases generated in a chemical factory or the like. Furthermore, the present invention relates in general to a pulse generator for use in the aforementioned exhaust gas treating apparatus and method, and more particularly, to a pulse generator which is useful as a power supply in the case that electrodes are placed in gases such as exhaust gases discharged from a thermal power plant or the like, that a (streamer discharge) plasma is then generated by delivering pulse power (or energy) to these electrodes (namely, by applying a pulse voltage across the electrodes) and that toxic substances are treated through electrical action.

2. Description of the Related Art

Hitherto, for instance, what is called an ammonia catalytic reduction method has been employed for decomposing $NO_x$. Further, what is called a lime-gypsum method has been employed for decomposing $SO_x$. Thus, what is called chemical processing or treatment methods (or processes) have been principal techniques for removing $NO_x$ and $SO_x$, which are contained in exhaust or flue gasses, therefrom.

Meanwhile, in recent years, a streamer discharge plasma exhaust gas treatment method has come to be employed as such a technique. In an apparatus for treating toxic substances contained in exhaust gases by using a streamer discharge plasma, the streamer discharge plasma is generated in a (plasma) reactor chamber. The configurations of, for example, a conventional line-pair cylindrical reactor chamber A and another conventional line-pair flat-plate-like reactor chamber B are illustrated in FIGS. 15 and 16, respectively. Streamer discharge plasmas are generated in the reactor chambers A and B by applying (same) high voltages $V_0$ across a line electrode 01 and a cylindrical electrode 02 of FIG. 15 and across a line electrode 06 and a plate electrode 08 of FIG. 16, respectively.

Electrons originated (or drawn) from a streamer discharge plasma are accelerated by an electric field, so that these electrons become high-energy ones. The high-energy electrons contained in the streamer discharge plasma decompose and detoxify toxic substances, such as $NO_x$ and $SO_x$, which are contained in exhaust gases, by colliding with the toxic substances. For instance, in the case of decomposing $NO_x$ such high-energy electrons collide with NO and $N_2$ to thereby induce the following reaction: $NO+N \rightarrow N_2+O$. Thus, NO is decomposed.

Radical density contributing to the decomposition of NO is determined by energy cast or applied to the streamer discharge plasma. Moreover, the reaction rate of a reaction component of a reaction system is also determined (incidentally, note that the treatment rate of NO is physically determined when the radical density is determined).

In the conventional method or system, one high-capacity high-voltage power supply and one high-capacity reactor chamber are used so as to generate a streamer discharge plasma. Incidentally, in FIGS. 15 and 16, reference characters 04, 05, 010 and 011 designate electric current introduction lines.

However, in the case of a reactor, which has one high-voltage power supply and one reactor chamber as illustrated in FIGS. 15 or 16, constant energy is cast into the entire reactor chamber, regardless of the concentration of the toxic substance. Thus, there is caused an excessive waste of energy in a region, in which the concentration of the toxic substance is low, in an outlet of the reactor chamber. Consequently, the energy required for the treatment is increased. Namely, when the concentration of the toxic substance is lowered to a target value in a reactor chamber, energy of the amount, which is not less than the necessary amount of energy, is consumed in the region in which the concentration thereof is low.

Further, as compared with the conventional chemical processing or treatment methods, the conventional streamer discharge plasma exhaust gas treatment method has large merit in that the facility therefor is in-expensive and that a space required to install the facility is small. The conventional streamer discharge plasma exhaust gas treatment method has large demerit in that the energy consumption required for generating a streamer discharge plasma is about 10 Wh/Nm$^3$ and is thus a little under two times that (namely, about 6 Wh/Nm$^3$) required in the case of the conventional chemical processing or treatment method.

Meanwhile, a pulse generator for generating large voltage pulses has been used as a power supply for use in an apparatus for performing the streamer discharge plasma exhaust gas treatment method.

FIG. 17 is a diagram conceptually illustrating the configuration of a conventional pulse generator of the distributed constant (or parameter) type that uses coaxial cables. In this figure, reference characters $1_{-1}$ and $1_{-2}$ denote distributed constant (or parameter) lines (namely, transmission lines); 3 a high-voltage side wiring line (or wire); 4 a low-voltage side wiring line; $V_0$ a D.C. charger; $S_1$ a shortcircuit switch; $V_{1-1}$ and $V_{1-2}$ voltages generated in the direction of arrows corresponding to the distributed constant lines $1_{-1}$ and $1_{-2}$ respectively; Z a load; and $V_p$ voltage applied to the load Z.

The distributed constant lines $1_{-1}$ and $1_{-2}$ are coaxial cables, whose characteristic impedances are $Z_{1a}$ and $Z_{1b}$, respectively, and whose lengths are L. Further, each of the distributed constant lines $1_{-1}$ and $1_{-2}$ is composed of: a corresponding one of cores (or core lines) $1_{-1a}$ and $1_{-2a}$; and a corresponding one of outer conductors (made of shield braid or cladding materials or the like) $1_{-1b}$ and $1_{-2b}$ which surround the cores $1_{-1a}$ and $1_{-2a}$ through insulating materials (not shown), respectively. Incidentally, a folding-back point or portion is constituted only by the cores $1_{-1a}$ and $1_{-2a}$ that are not sheathed. These cores $1_{-1a}$ and $1_{-2a}$ are connected in series with each other. Further, an end (namely, an input-side portion) of these cores is connected to the D.C. charger $V_0$ through the high-voltage side wiring line 3. On the other hand, the outer conductors $1_{-1b}$ and $1_{-2b}$ are connected to each other by a shortcircuit line $5_{-1}$ at the side of the shortcircuit switch $s_1$ (namely, at the input-side terminal or end portion) and is thus shortcircuited. Moreover, the input-side terminal portion of the outer conductor $1_{-1b}$ is connected to a grounding or earthing line serving as the low-voltage side wiring line 4. Furthermore, the input-side terminal portion of the outer conductor $1_{-2b}$ is connected to the high-voltage side wiring line 3 through the shortcircuit switch $S_1$.

In this case, the impedance of the D.C. charger $V_0$ acting as a power supply is matched to that of the load Z. Namely, $Z=Z_{1a}+Z_{1b}$.

Furthermore, in the case that the characteristic impedances of the distributed constant lines $1_{-1}$ and $1_{-2}$ are equal to each other, namely, in the case that the very same distributed constant lines $1_{-1}$ and $1_{-2}$ are used, the (voltage) propagation velocities of voltage signals in these distributed constant lines $1_{-1}$ and $1_{-2}$ are equal to each other. In the case where the dielectric constant of the insulating materials is E and the magnetic permeability thereof is $\mu$, the voltage propagation velocity v is given by the following equation (1):

$$V = \frac{1}{\sqrt{\epsilon\mu}} \quad (1)$$

In the case of such a pulse generator, the shortcircuit switch $S_1$ is opened as an initial condition. Further, the high-voltage side wiring line 3 indicated by a thick line is charged by means of the D.C. charger $V_0$ to the voltage $V_0$. In this case, an output voltage V $1_{-1}$ of the distributed constant line $1_{-1}$ is $V_0$, while an output voltage $1_{-2}$ of the distributed constant line $1_{-2}$ is $-V_0$. Further, the voltage $V_p$ applied across the load Z is 0. The compositions of voltage waves respectively traveling in the distributed constant lines $1_{-1}$ and $1_{-2}$ are represented by sums of a progressive wave and a backward wave as indicated at moment t=0 in FIGS. 18(a) and 18(b).

Namely, FIGS. 18(a) and 18(b) illustrate the conditions of the voltage waves respectively traveling in the distributed constant lines $1_{-1}$ and $1_{-2}$ upon completion of operating (namely, turning on) the shortcircuit switch $S_1$ at the moment t=0 after received. To put it more precisely, these figures corresponding to the moment t=0 represent the conditions of these voltage waves immediately before the shortcircuit switch $S_1$ is turned on. At a moment t=L/2v, in the distributed constant line $1_{-2}$, the inversion of the polarity of the voltage wave occurs in a shortcircuit-switch-side part thereof, which is located at the side of the shortcircuit switch $S_1$. In contrast, no variation in the voltage wave occurs in the distributed constant line $1_{-1}$, because both of the shortcircuit-switch-side terminal part and the load-side terminal part thereof, which are respectively located at the side of the shortcircuit switch $S_1$ and the side of the load Z, are open ends (to be exact, both of these terminal or end parts thereof are regarded as open ends because exchanges of energy actually occur between the load and each of the distributed constant lines $1_{-1}$ and $1_{-2}$ but the exchanged energies cancel out).

Subsequently, at a moment t=L/v, the load-side terminal part of the distributed constant line $1_{-2}$, which is located at the side of the load Z, is put into a shortcircuited state, so that the voltage $V_p$ applied to the load Z becomes $V_0$. This causes a variation in the voltage developed across the distributed constant line $1_{-1}$. As described above, the impedance of the charger $V_0$ is matched to that of the load Z, the voltage waves travelling in the distributed constant lines $1_{-1}$ and $1_{-2}$ are not reflected by the end surfaces thereof but start propagating therefrom to the load Z. Further, a voltage generated in a time period between the moments t=L/v and t=3L/v is applied to and absorbed by the load, as illustrated in FIG. 18(c). As a result, the voltage, which has a peak value (or potential) of $V_0$ and further has a pulse width of 2L/v, is supplied to the load Z, as illustrated in FIG. 18(c).

Thereafter, when the shortcircuit switch $S_1$ is released or opened, the pulse generator is placed into the initial condition again. The process described hereinabove is performed repeatedly.

In the case that the peak (value of) voltage is raised by using the device illustrated in FIG. 17, a device configured as illustrated in FIG. 19 by stacking the devices, each of which is illustrated in FIG. 17, in such a way as to be independent of each other, suffices for such a purpose.

In FIG. 19, reference character $V_0$ designates a D.C. charger; $S_1, S_2, \ldots, S_N$ shortcircuit switches; $1_{-1}, 1_{-2}, 2_{-1}, 2_{-2} \ldots, N_{-1}, N_{-2}$ distributed constant lines; L the length of each of the distributed constant lines; Z a load; $V_p$ an output voltage applied to the load Z; 3 a high-voltage-side wiring line; 4 a low-voltage-side wiring line; and $5_{-1}, 5_{-2}, 5_{-N}$ short-circuit lines. Here, note that pairs of outer conductors $((1_{-2b}, 2_{-1b}), (2_{-2b}, 3_{-1b}), \ldots, ((N-1)_{-2b}, N_{-1b}))$, each pair of which adjoin with each other as upper and lower stages, are connected with each other through connection lines $9_{-1}, 9_{-2}, \ldots, 9_{-(N-1)}$, serially, at the output-side terminal or end parts of the distributed constant lines $1_{-1}, 1_{-2}, 2_{-1}, 2_{-2}, \ldots, N_{-1}, N_{-2}$. On the other hand, the pairs of outer conductors $((1_{-2b}, 2_{-1b}), (2_{-2b}, 3_{-1b}), \ldots, ((N-1)_{-2b}, N_{-1b}))$ are not connected with each other at the input-side terminal parts of the distributed constant lines $1_{-1}, 1_{-2}, 2_{-1}, 2_{-2}, \ldots, N_{-1}, N_{-2}$, which are located at the sides of the shortcircuit switches $S_1, S_2, \ldots, S_N$. A circuit illustrated in FIG. 20 is an equivalent circuit of the circuit illustrated in FIG. 19. In FIG. 20, same reference numerals designate same components of the circuit of FIG. 19. Further, the (redundant) descriptions of such components are omitted herein.

Here, consider the case that all of the distributed constant lines $1_{-1}, 1_{-2}, 2_{-1}, 2_{-2}, \ldots, N_{-1}$ and $N_{-2}$ from the bottom stage (namely, the first stage) to the top stage (namely, the Nth stage) as viewed in this figure, which have the same characteristic impedance and the same length, are used. Incidentally, in this case, it is assumed that the impedance of the load Z is matched to that of the power supply, namely, $Z=Z_{1a}+Z_{1b}+Z_{2a}+Z_{2b}+ \ldots +Z_{Na}+Z_{Nb}$.

In the initial condition, the shortcircuit switches $S_1, S_2, \ldots, S_N$ are turned off. Moreover, the high-voltage side wiring line 3 indicated by the thick line is charged by means of the D.C. charger $V_0$ to the voltage $V_0$.

Upon completion of the charging, the shortcircuit switches $S_1, S_2, \ldots, S_N$ are simultaneously turned on at the moment t=0. If the shortcircuit switches $S_1, S_2, \ldots, S_N$ are completely simultaneously turned on, the voltage $V_p$ applied to the load Z at that time has the waveform as illustrated in FIG. 21. Therefore, a pulse, which has the peak voltage of $NV_0$ and further has the pulse width of (2L/v), is supplied to the load Z.

FIG. 17 is a diagram conceptually illustrating the configuration of another conventional pulse generator of the distributed constant type that uses parallel flat plates. In this figure, same reference characters designate same portions of FIG. 6.

As shown in FIG. 22, the distributed constant lines $11_{-1}$ and $11_{-2}$ have flat plates $11_{-1a}, 11_{-2a}$ and $11_{-3}$, each of which has the same length L and further has the same width W. Further, the flat plate $11_{-3}$ is inserted between the flat plates $11_{-1a}$ and $11_{-2a}$ in such a manner that these three flat plates are parallel to one another. At that time, the flat plate $11_{-2}$ has the input-side terminal part connected to a terminal of the shortcircuit switch $S_1$, which is opposite to the D.C. charger $V_0$, and is grounded similarly as the flat plate $11_{-1a}$ that has the input-side terminal part connected to the low-voltage wiring line 4 serving as a grounding line. The flat plate $11_{-3}$ has the input-side terminal part which is connected to a high-voltage-side wiring line 3. The flat plates $11_{-1a}$, $11_{-2a}$ and $11_{-3}$ are insulated by dielectric insulating materials (or insulators), which are inserted between the adjacent flat plates ($11_{-1a}$, $11_{-3}$) and between the adjoining flat plates ($11_{-3}$, $11_{-2a}$), respectively, and have the same dielectric constant $\in$, the same magnetic permeability $\mu$ and the same thickness D and further have the functions similar to those of a capacitor.

Thus, the distributed constant line $11_{-1}$, whose characteristic impedance is $Z_{11a}$, is constituted by the flat plates $11_{-1a}$ and $11_{-3}$, while the distributed constant line $11_{-2}$, whose characteristic impedance is $Z_{11b}$, is constituted by the flat plates $11_{-1b}$ and $11_{-3}$.

The capacitance C (of these distributed constant lines $11_{-1}$ and $11_{-2}$) in this case is given by the following equation:

$$C=2\in LW/D.$$

Thus, the capacitance C can be increased to a large value by changing the size (namely, the length L×the width W), the thickness D or the dielectric constant $\in$.

Here, note that the impedance of the D.C. charger $V_0$ is matched to that of the load Z, namely, $Z=Z_{11a}+Z_{11b}$. Further, the distributed constant lines $11_{-1}$ and $11_{-2}$ have the same characteristic impedance. Namely, in the case of using the same distributed constant lines $11_{-1}$ and $11_{-2}$, the propagation velocities v of the voltage (wave) in these distributed lines are equal to each other.

Even in the case of the aforesaid pulse generator, which is thus configured by the parallel flat plates, the pulse voltage as illustrated in FIG. 18(c) is supplied to the load Z by the action similar to that in the case of the pulse generator configured by the coaxial cable of FIG. 5.

In the case that the peak voltage is raised by using the circuit illustrated in FIG. 22, a device configured as illustrated in FIG. 23 by stacking the circuits or units, each of which is illustrated in FIG. 22, in such a way as to be independent of each other, suffices for such a purpose. This device corresponds to the device illustrated in FIG. 19. Thus, in FIG. 23, same reference numerals designate same portions of FIG. 19. Further, the redundant description of such portions is omitted.

The pulse generator of FIG. 23 Is obtained by stacking up N (stages) of the pulse generators, each of which has the structure shown in FIG. 22 and is used as a component unit. Namely, this device has the N stages of the distributed constant lines $11_{-1}$, $11_{-2}$, $12_{-1}$, $12_{-2}$, . . . , $NN_{-1}$, $NN_{-2}$, which are constituted by the parallel flat plates. Incidentally, in each pair (or stage) of the upper and lower stages, a single flat plate serves as both of the top flat plate of the lower stage and the bottom flat plate of the upper stage.

Even in the case of such a pulse generator, the pulse voltage illustrated in FIG. 21 is generated by simultaneously turning on the shortcircuit switches $S_1$, $S_2$, . . . , $S_N$ upon completion of predetermined preparation, similarly as in the case of the pulse generator of FIG. 19.

However, in the case of generating pulses be means of the pulse generators configured as illustrated in FIGS. 19 and 23, it is necessary to simultaneously turn on the shortcircuit switches $S_1$, $S_2$, . . . , $S_N$, though the turning-on operation of each of these switches is not performed in exact timing (namely, in perfect synchronization) with those of the other switches and thus there is observed a phenomenon in which the output voltage $V_p$ drops. This is because of the facts that the pulse width is of the order of nanoseconds (ns) and is thus extremely short, that therefore, the influence of delay in the application of a trigger voltage or On discharge due to the difference among the wiring impedances respectively corresponding to the shortcircuit switches $S_1$, $S_2$, . . . , $S_N$ is enhanced and that it is difficult to time the operations of turning on the shortcircuit switches (namely, it is difficult to simultaneously turn on the N switches).

If there is caused the delay in the application of the trigger voltage, output voltages $V_p$ of three circuits have waveforms, for example, A, B and C as illustrated in FIG. 24. Thus, a synthesis pulse (A+B+C) synthesized from these three pulses A, B and C has a waveform as shown in this figure. Consequently, a pulse, which has an ideal waveform and has a pulse width of 100 ns and a peak voltage $3V_0$, is not obtained.

The present invention is accomplished in view of the aforementioned various problems of the conventional apparatuses and methods.

OBJECT AND SUMMARY OF THE INVENTION

Accordingly, a first object of the present invention is to provide a multi-stage exhaust gas treatment apparatus that can reduce the energy consumption of and decrease the size and weight of a gas treatment reactor which is supplied with energy from a high-voltage and has a reactor chamber for generating a streamer discharge plasma and decomposes toxic substances by letting exhaust gases flow through this chamber.

Further, a second object of the present invention is to provide a streamer discharge plasma gas treatment apparatus and method that save energy by preventing electricity (or power) consumption thereof from rising more than that in the case of employing the conventional chemical processing or treatment methods.

Moreover, a third object of the present invention is to provide a pulse generator which can supply outputs of a plurality of pulse generating portions, which are connected in parallel with one another, to a load as a pulse having an ideal waveform.

To achieve the foregoing first object, in accordance with an aspect of the present invention, there is provided an exhaust gas treatment apparatus configured by dividing a reactor chamber into a plurality of reactor sub-chambers and next connecting the plurality of reactor sub-chambers in series as a plurality of stages. Further, this apparatus is adapted so that large energy is cast into upstream reactor sub-chambers but energy to be cast into a reactor sub-chamber is gradually decreased as the reactor sub-chamber to be supplied with energy becomes closer to the most downstream reactor sub-chamber (less energy is supplied to each successive downstream-side chamber of the plurality of chambers). Incidentally, when connecting a plurality of reactor sub-chambers in series, a multiple stages of the reactor sub-chambers may be connected like a meander pattern or may be coaxially arranged.

With the configuration described herein-above, in accordance with the exhaust gas treatment reactor or apparatus and method, the waste of energy cast into downstream reactor sub-chambers can be minimized. In addition, the efficiency in the treatment of a toxic substance can be increased by setting the cast energy according to the concentration of the toxic substance at the inlet of each of the reactor sub-chambers.

Further, to achieve the foregoing second object of the present invention, there is provided a streamer discharge plasma exhaust gas treatment apparatus for detoxifying toxic ingredients or components contained in exhaust gases by using a streamer discharge plasma. In this apparatus, the (electron) density of electrons generated in a gas decomposition unit is set so that the electron density is high in a portion, which is located at a front or upstream side (namely, at the side of the upstream) of the exhaust gas flow, of the unit but is low in a portion, which is located at a back or rear side (namely, at a downstream side (that is, at the side of the downstream)) thereof, of the unit.

Moreover, the aforementioned streamer discharge plasma exhaust gas treatment apparatus is adapted so that the "density" of the number of turns (or what is called the wire density (namely, the number of turns per unit length)) of a coil for generating a streamer discharge plasma in the gas decomposition unit is high (or large) in a portion, which is located at an upstream side of the exhaust gas flow, of the unit but the wire density of the coil is low in a portion, which is located at a downstream side thereof, of the unit.

Furthermore, in the aforementioned streamer discharge plasma exhaust gas treatment apparatus, the flow velocity of the exhaust gas in the gas decomposition unit is set at a low value in the (front-side (or upstream-side)) portion, which is located at an upstream side of the exhaust gas flow, of the unit but the flow velocity thereof is set at a high value in the (rear-side or (downstream-side)) portion, which is located at a downstream side thereof, of the unit.

Besides, in accordance with a streamer discharge plasma exhaust gas treatment method, the toxic ingredients or components are detoxified by using one of the aforementioned streamer discharge plasma exhaust gas treatment apparatuses.

Incidentally, the "streamer discharge plasma" referred to herein is a discharge plasma in the initial condition of a discharge, in which a discharge path is formed. In this condition, high-energy electrons can be generated at an end or terminal portion of the discharge path. Therefore, the "streamer discharge plasma" is effective in treating exhaust. gases.

Further, in the exhaust gas, the concentration of a toxic ingredient, namely, $NO_x$ or $SO_x$ is high in a portion, which is located at an upstream side of the exhaust gas flow (namely, at an inlet side), of the unit but the concentration of such a toxic ingredient is low in a portion, which is located at a downstream side thereof (namely, at an outlet side), of the unit. Furthermore, it has been known that because molecules of the toxic ingredient such as $NO_x$ or $SO_x$ are decomposed by high-energy electrodes generated by the streamer discharge plasma, a high-energy-electron generation rate in the downstream-side portion of the gas decomposition unit is lower than the high-energy-electron generation rate in the upstream-side portion thereof. Thus, in accordance with a technical idea of the present invention, the gas decomposition unit is adapted so that the high-energy-electron generation rate corresponds to (namely, is proportional to) the concentration (or the number of molecules) of $NO_x$ or $SO_x$. Thereby, the excessive supply of energy is prevented, especially, in the downstream-side portion.

Note that the "electron generation rate" referred to herein is defined as the number of electrons generated per unit volume (or capacity) of the exhaust gas and per unit time, namely, the electron density ($/cm^3 \cdot sec$) of the exhaust gas. Thus, the present invention achieves the energy-saving by establishing the "proportionality between the electron density (of an exhaust gas) and the concentration of a gas component to be decomposed". Additionally, in the description of the apparatus and method of the present invention, the expression "(the electron density is set as being) high in the upstream-side portion, but is low in the downstream-side portion" means in general that the electron density is set in such a manner as to decrease in the direction from the upstream-side of the exhaust gas flow to the downstream-side thereof.

Besides, to achieve the aforesaid third object of the present invention, pulse generators of the present invention employ the following configurations:

(1) A pulse generator of the present invention comprises:

a plurality of stages of a same configuration provided with distributed constant lines having high-voltage-side input(-side) terminal portions, which are connected in common to a high-voltage-side wiring line connected with a high-voltage-side terminal of a D.C. charger, and further having low-voltage-side input(-side) terminal portions, which are connected in common to a grounding line serving as a low-voltage-side wiring line connected with a low-voltage-side terminal of the D.C. charger, low-voltage-side output(-side) terminal portions of the adjoining distributed constant lines, which respectively correspond to adjacent upper and lower ones of the stages, being connected in sequence or series;

a load connected between a low-voltage-side output(-side) terminal portion of a top one of the distributed constant lines of a top stage and a low-voltage-side output(-side) terminal portion of a bottom one of the distributed constant lines of a bottom stage; and a shortcircuit switch connected between the high-voltage-side wiring line and the low-voltage-side wiring line.

(2) In the configuration (1) described herein-above, folded-back parts of core lines of the distributed constant lines respectively serving as component units of each single stage are connected to the high-voltage side wiring line. Further, two outer conductors surrounding remaining parts of the core lines, which are other than the parts connected to the high-voltage side wiring line, through insulating materials are connected to the low-voltage-side wiring line. Moreover, input(-side) terminal portions of adjacent ones of the outer conductors are shortcircuited by a shortcircuit line.

(3) In the configuration (1) described herein-above, two flat plates, each of which has a U-shaped section, of the distributed constant lines respectively serving as component units of each single stage are connected to the low-voltage side wiring line. Further, other two flat plates inserted between the two flat plates, each of which has the U-shaped section, through insulating materials are connected to the low-voltage side wiring line. Moreover, the flat plates connected to the low-voltage side wiring line are shortcircuited by a shortcircuit line at input(-side) terminal portions thereof. Furthermore, the flat plates connected to the high-voltage side wiring line are shortcircuited by a shortcircuit line at output(-side) terminal portions thereof.

(4) In the configuration (1) described herein-above, two flat plates, which are provided in such a way as to be parallel to each other, of the distributed constant lines respectively serving as component units of each single stage are connected to the low-voltage side wiring line. Further, another flat plate inserted between the two parallel flat plates in such a way as to be parallel with the latter two parallel flat plates is connected to the high-voltage side wiring line.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 13($b$) is a block diagram illustrating the configuration of one component unit in the second example of the pulse generator of the present invention;

FIGS. 18A to 18C are is a diagram illustrating the principle of generating pulses in the pulse generator of FIG. 17;

DETAILED DESCRIPTION OF THE PREFERRED EMBODIMENTS

Hereinafter, the preferred embodiments of the present invention, namely, exhaust gas treatment apparatuses (or multi-stage exhaust gas treatment reactors) embodying the present invention will be concretely described in detail by referring to the accompanying drawings.

FIRST EXAMPLE OF EXHAUST GAS TREATMENT APPARATUS

Figure 1:
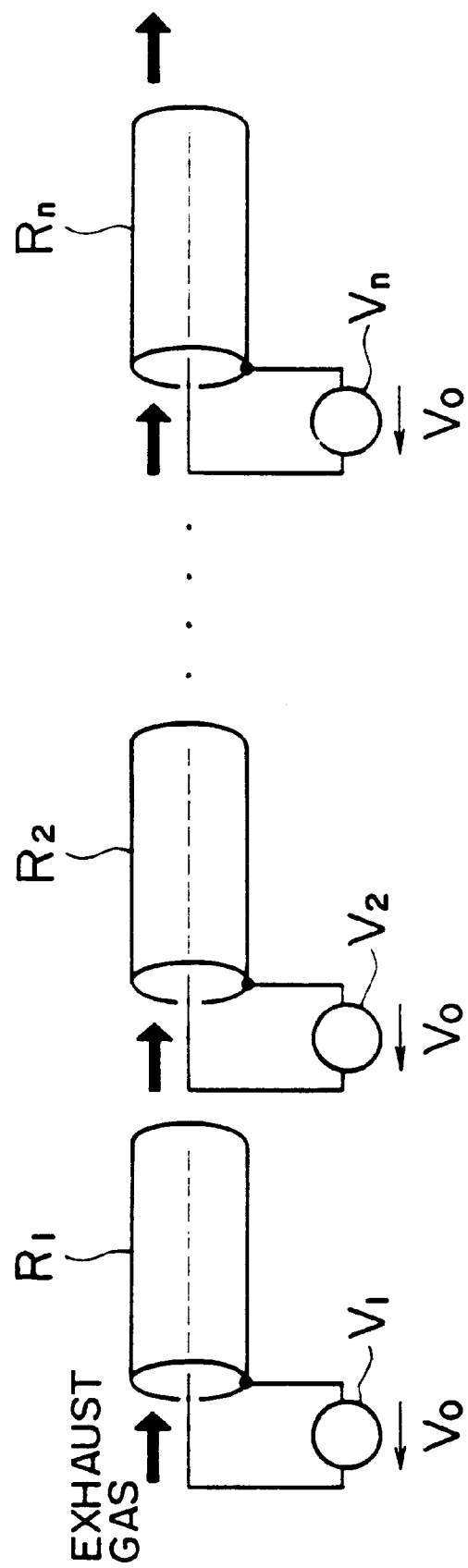
FIG. 1 is a diagram illustrating the configuration of a line-pair cylindrical reactor chamber of an exhaust gas treatment reactor which is a first embodiment of the present invention.
Figure 2:
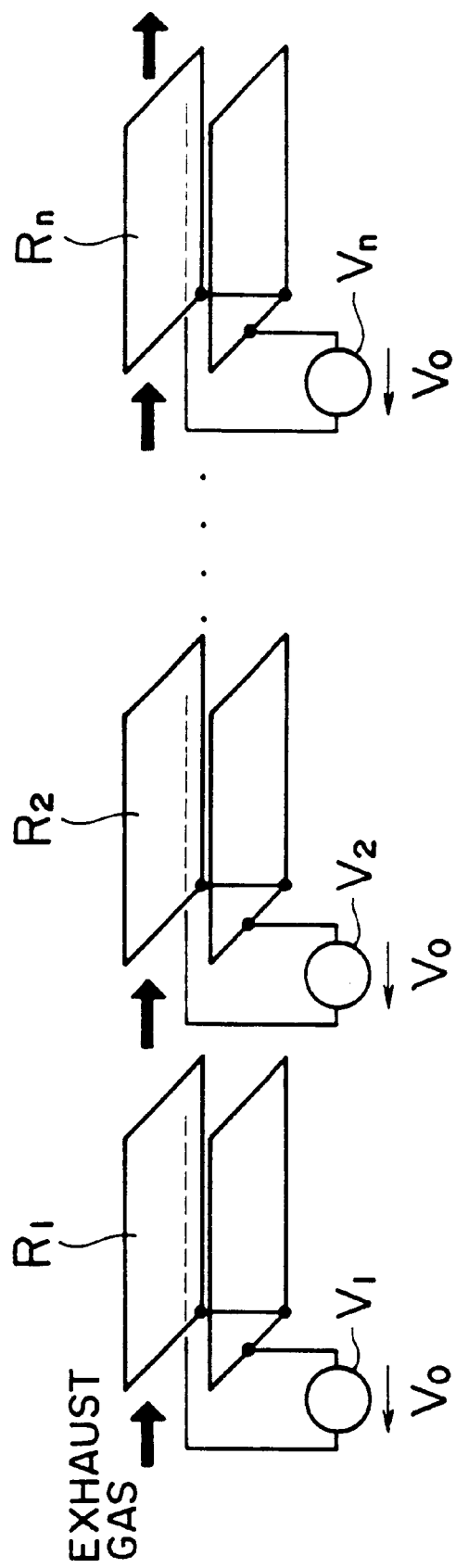
FIG. 2 is a diagram illustrating the configuration of a line-pair flat-plate-like reactor chamber of an exhaust gas treatment reactor which is a first embodiment of the present invention.

First, a first example of an exhaust gas treatment apparatus embodying the present invention will be described hereinbelow. FIG. 1 illustrates the case where each of reactor chambers of the apparatus is shaped like a line-pair cylinder. FIG. 2 illustrates the case where each of the reactor chambers of the apparatus is formed in such a manner as to have a line-pair flat plate structure. The operating principle in the case of the apparatus of FIG. 1 is the same as of the case of the apparatus of FIG. 2. As illustrated in FIGS. 1 and 2, n stages of the reactor chambers $R_{-1}$, $R_{-2}$, . . . and $R_n$ are connected in series in the direction in which an exhaust gas flows. Further, high-voltage power sources or supplies $V_1$, $V_2$, . . . and $V_n$ are connected to the reactor chambers $R_{-1}$, $R_{-2}$, . . . and $R_n$, respectively.

Figure 3:
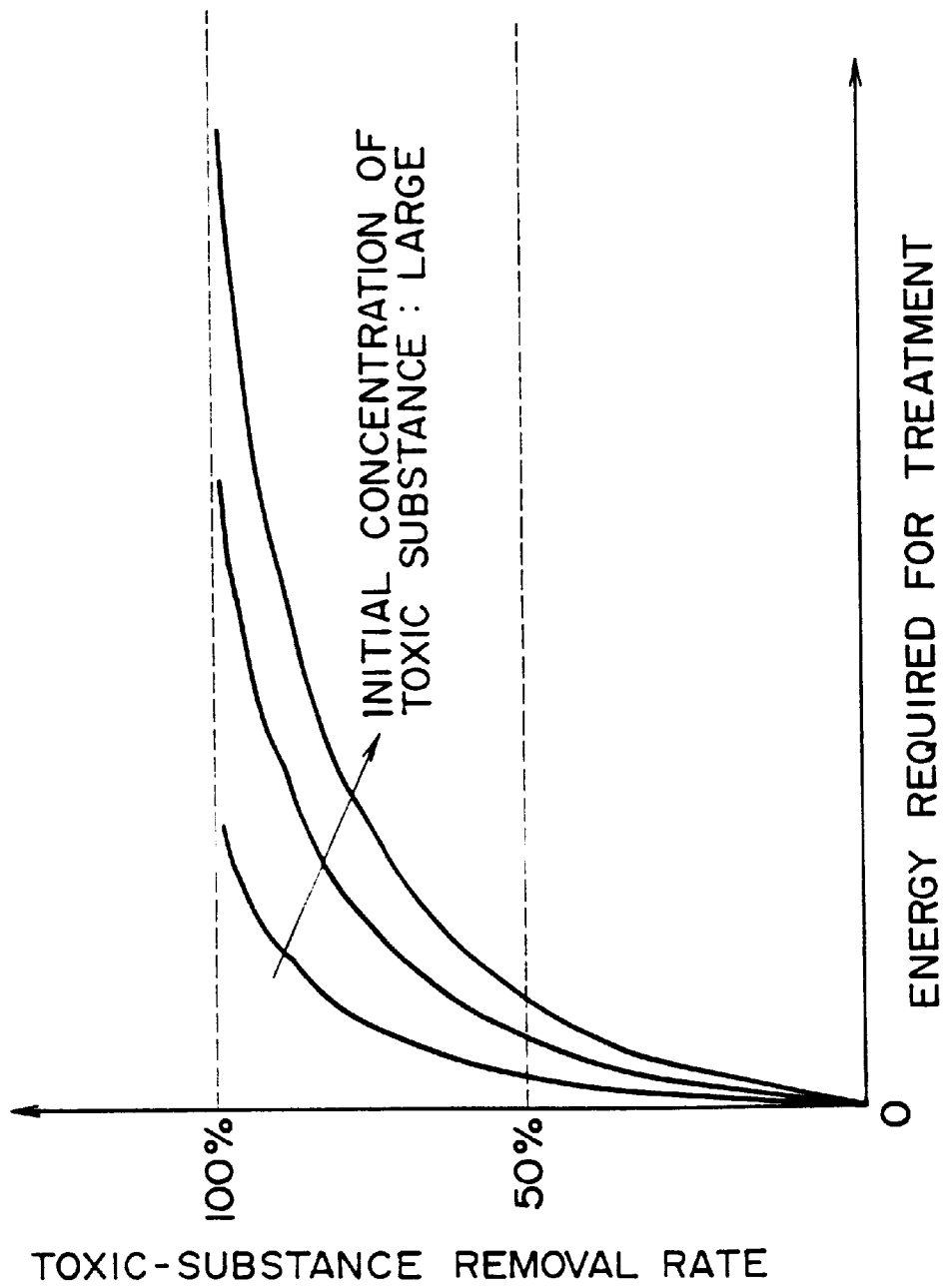
FIG. 3 is a graph illustrating the relation between energy, which is required for treatment of a toxic substance, and each of quantities of the toxic substance, which differ from one another owing to the difference among the initial densities thereof.

The relation between energy, which is required for treatment of a toxic substance, and each of quantities of the toxic substance (namely, removal rates thereof), which differ from one another owing to the difference among the initial densities thereof, is shown in FIG. 3.

As is seen from the characteristic diagram or graph of FIG. 3, if the initial concentration of the toxic substance is high, energy required to realize a same removal rate increases. Conversely, the energy consumption of the apparatus can be reduced by casting energy, which corresponds to the concentration of the toxic substance, into the reactor chambers of the apparatus.

Radical density contributing to the decomposition of the toxic substance is determined by both of the initial concentration of the toxic substance and the energy cast or applied to a streamer discharge plasma. Moreover, the reaction rate of a reaction component of a reaction system is also determined. Therefore, as the initial concentration of the toxic substance becomes lower, the lower the energy cast and required to achieve a same removal rate becomes (namely, when the initial concentration thereof is low, the number of molecules of the toxic substance to be decomposed is decreased, so that the decomposition of the toxic substance is achieved by casting low energy to the apparatus).

Figure 4:
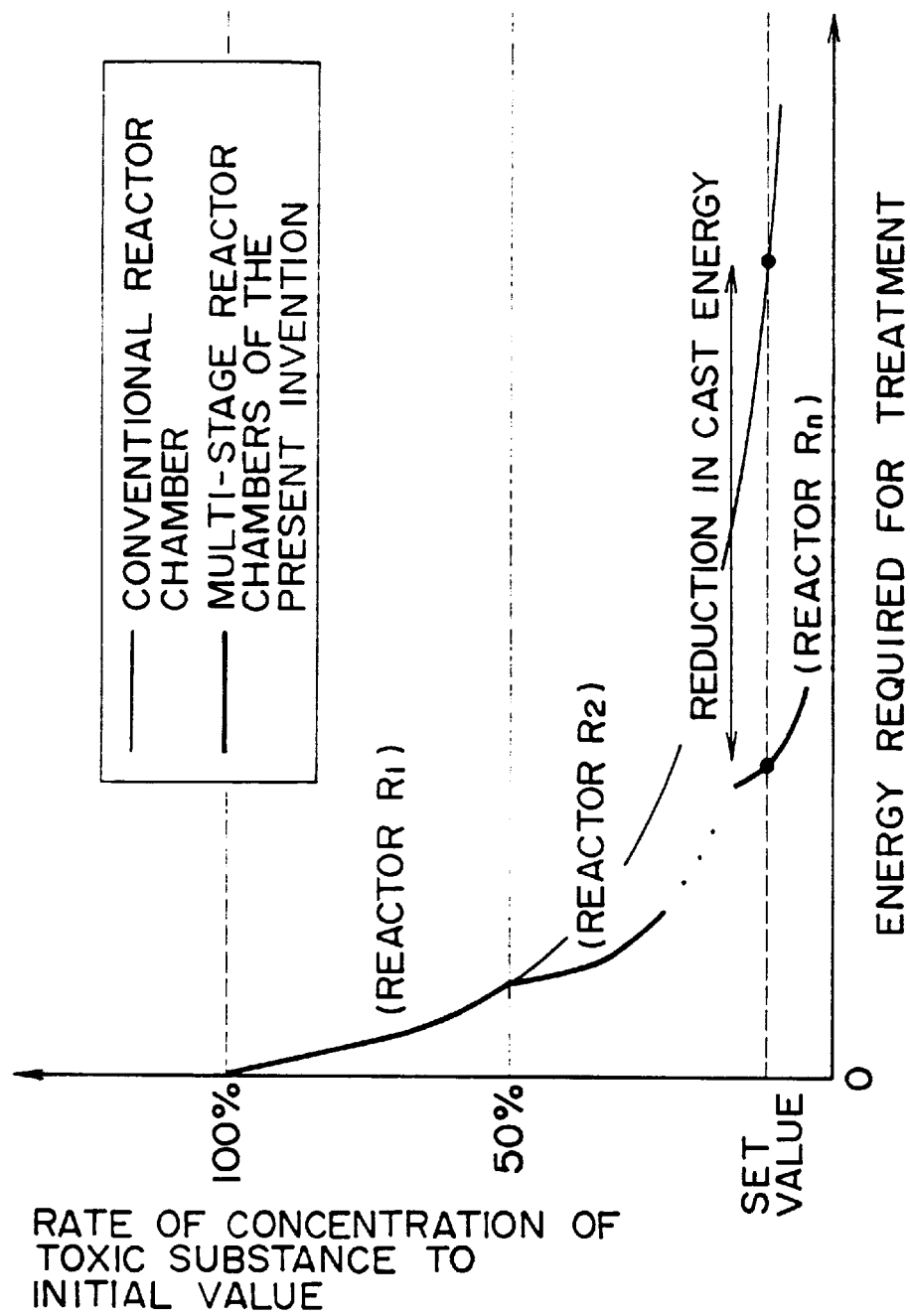
FIG. 4 is a graph illustrating the relation between the energy consumption conditions in the cases of the multi-stage reactor chamber of the present invention and the conventional reactor chamber for a comparison therebetween.

As shown in FIG. 4, the reactor chamber $R_1$ is placed at the side of the upstream of the exhaust gas, so that the concentration of the toxic substance is high in this reactor chamber. Thus, high energy $E_1$ is cast thereto, so that a quantity of the toxic substance, which corresponds to 50% or so of the initial concentration, is treated or decomposed. Thereafter, optimum energy $E_2$, which is less than the energy $E_1$, is cast or applied to the reactor chamber $R_2$, so that a quantity of the toxic substance, which corresponds to 50% or so of the initial concentration (namely, 75% of the initial concentration thereof in the reactor chamber $R_1$), is treated or decomposed. Thence, the treatment is repeatedly performed until the decomposition of the toxic substance in the reactor chamber $R_n$ is completed. Thus, the toxic substance is removed to a certain concentration (represented as $\{1-(50/100)^n\}$ % of the initial concentration of the toxic substance in the reactor chamber $R_1$) thereof by decreasing the cast energy. Thereby, the cast energy is reduced considerably.

The efficiency in treating the toxic substance can be enhanced by casting energy, which corresponds to the concentration of the toxic substance contained in the exhaust gas, to the reactor chambers (namely, applying (relatively) high energy to the upstream-side reactor chambers, in which the concentration of the toxic substance contained in the exhaust gas is high, but applying (relatively) low energy to the downstream-side reactor chambers, in which the concentration of the toxic substance contained in the exhaust gas is low). For example, in the case that the apparatus has three stages of reactor chambers, the toxic substance of a quantity corresponding to 50% or so of the initial concentration thereof is decomposed in the first stage (or reactor chamber). Then, the toxic substance of another quantity corresponding to 50% or so of the remaining concentration thereof is further decomposed in the second stage. Subsequently, the toxic substance of still another quantity corresponding to 50% or so of the remaining concentration thereof is further decomposed in the third stage. Finally, the toxic substance of the quantity corresponding to 87.5% (namely, $(1-0.5^3)\times100\%$) of the initial concentration thereof is decomposed in the three stages. In such a case, the required energy is reduced by 30% or so in comparison with the energy required in the case of the conventional apparatus.

Thus, as a result of employing a multiple-stage structure, namely, using a plurality of exhaust-gas treatment reactor chambers in this way, the apparatus can be operated under optimum conditions by optionally selecting energy cast into each of the reactor chambers as described in TABLE 1 listed below. Incidentally, in this table, characters a, b and c designate three cases. Further, columns (1), (2) and (3) represent removal rates.

TABLE 1

|  | (1) | (2) | (3) |
| --- | --- | --- | --- |
| a: | 40% | 60% | 50% |
| b: | 50% | 50% | 50% |
| c: | 60% | 60% | 60% |

Moreover, the number of stages can be determined by setting the treatment rate, which corresponds to each stage, according to the kind of the toxic substance (for instance, in the case that the removal rate corresponding to each stage is 30% and the number of stages is 5, the toxic substance of the quantity corresponding to 83% (because $(1-0.7)\times100\%$ =83) of the initial concentration thereof is removed). Chambers, whose structures are other than the line-pair cylindrical structure and the line-pair flat-plate structure, may be employed as the reactor chambers. The energy cast into each stage can be controlled by means of a controller by connecting the reactor chambers to a device (not shown) for detecting the kind of the toxic substance and for measuring the concentration thereof.

SECOND EXAMPLE OF EXHAUST GAS TREATMENT APPARATUS

Figure 5:
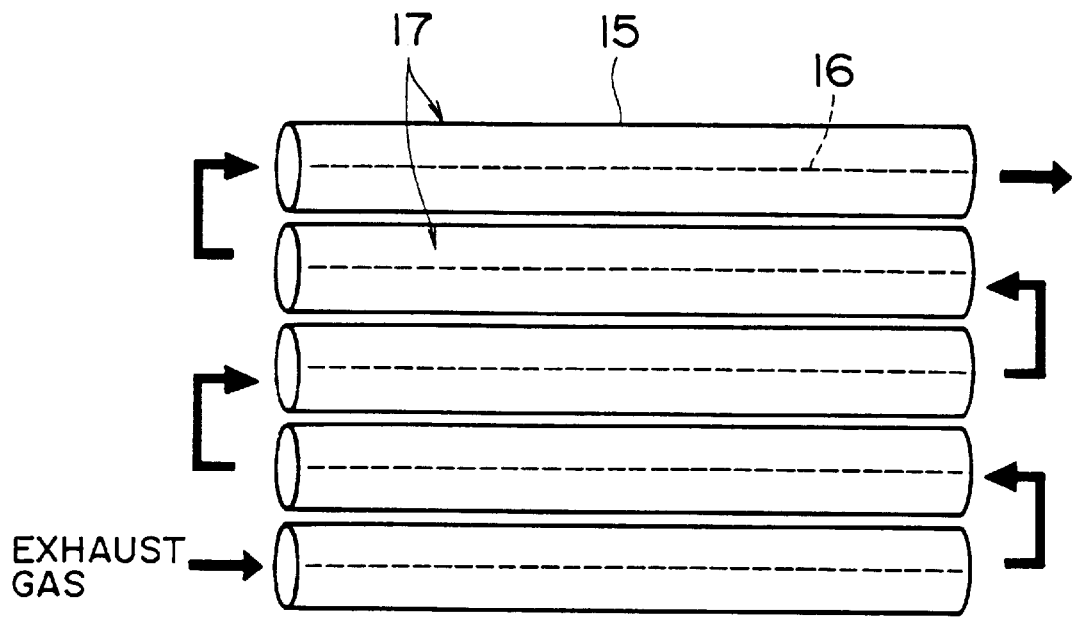
FIG. 5 is a diagram illustrating the configuration of a meander-like multi-stage reactor chamber of an exhaust gas treatment reactor which is a second embodiment of the present invention.

Next, a second example of the exhaust gas treatment apparatus according to the present invention will be described hereinbelow by referring to FIG. 5.

This exhaust gas treatment apparatus or reactor, namely, the second example employs a multi-stage reactor system obtained by connecting a plurality of stages of reactor chambers, each of which is composed of an outer cylindrical electrode 15 and an inner line (or linear) electrode 16, like a meander pattern.

Similarly as in the case of the first example, the energy to be cast into a reactor chamber is decreased as the reactor chamber to be supplied with the energy becomes closer to the most downstream reactor chamber. In the case of this second example, the size of the entire reactor system is reduced (namely, the entire reactor system is made to be compact in size) by connecting the plurality of stages of reactor chambers 17 in series like a meander pattern.

THIRD EXAMPLE OF EXHAUST GAS TREATMENT APPARATUS

Figure 6:
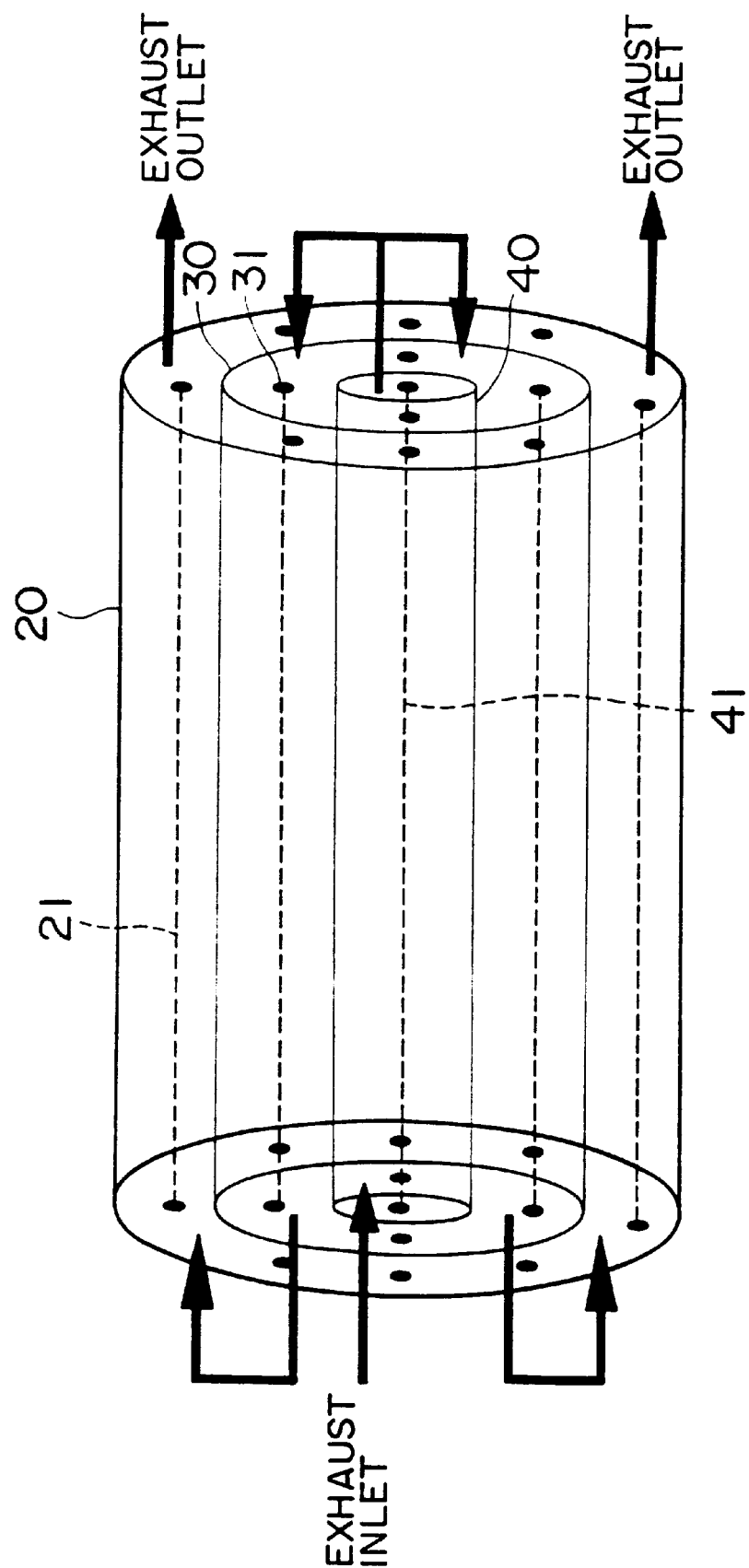
FIG. 6 is a diagram illustrating the configuration of a coaxial multi-layer multi-stage reactor chamber of an exhaust gas treatment reactor which is a third embodiment of the present invention.

Next, a third example of the exhaust gas treatment apparatus according to the present invention will be described hereinbelow by referring to FIG. 6.

In the case of this exhaust gas treatment apparatus, namely, the third example, outer cylindrical electrodes 30 and 40 are coaxially inserted in sequence into an outer cylindrical electrode 20, so that the reactor system is configured by coaxially arranging the outer cylindrical electrodes. Linear electrodes 21, 31 and 41 correspond to the cylindrical electrodes 20, 30 and 40, respectively. In FIG. 6, black arrows indicate the flows of the treated gas.

The third example of the treatment apparatus is made to be compact in size by employing a structure in which the exhaust gas to be treated flows in the coaxial reactor chambers alternately backward and forward from the innermost reactor chamber to the outermost reactor chamber. In this case, the treatment apparatus may be adapted so that the exhaust gas flows in the coaxial reactor chambers alternately backward and forward from the outermost reactor chamber to the innermost reactor chamber. Thereby, the entire exhaust gas treatment apparatus can be made to be compact in size.

As above described, in the case of the exhaust gas treatment apparatus of the present invention, energy is supplied from the high-voltage power sources. Further, the reactor chambers each for generating streamer discharge plasma are connected in series as a plurality of stages in the direction in which the exhaust gas flows. Moreover, the energy to be cast into a reactor chamber is reduced as the reactor chamber to be supplied with the energy becomes closer to the most downstream reactor chamber (the less energy is supplied to the more downstream chamber of the plurality chamber). Thus, the power consumption of the apparatus can be decreased. Furthermore, the size of the apparatus can be achieved by connecting the plurality of stages of reactor chambers in series like a meander pattern or by coaxially arranging the plurality of stages of reactor chambers.

FOURTH EXAMPLE OF EXHAUST GAS TREATMENT APPARATUS

Figure 7:
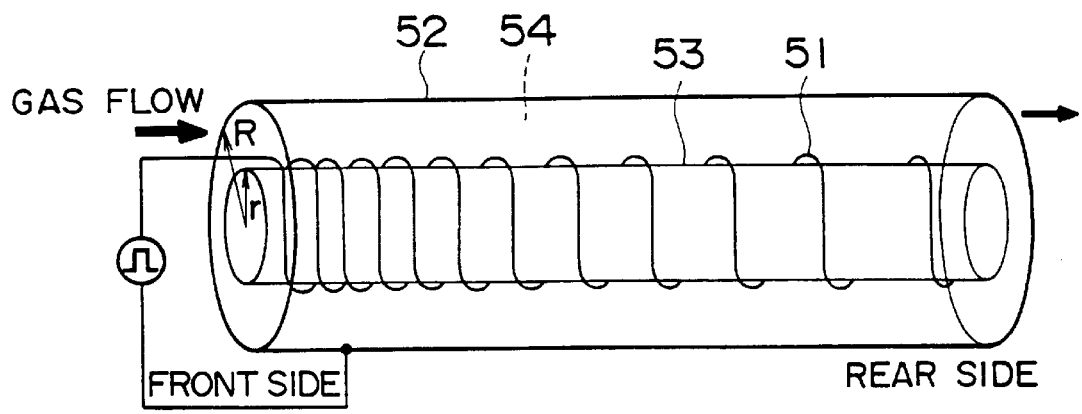
FIG. 7 is a perspective diagram illustrating the configuration of a fourth embodiment of the present invention.

FIG. 7 illustrates the configuration of a gas decomposition unit that is a primary part of a fourth example of the (streamer discharge plasma) exhaust gas treatment apparatus embodying the present invention. This gas decomposition unit is provided with an inner cylinder 53, around which a coil 51 is wound, and an outer cylinder 52 surrounding this inner cylinder 53. Further, an annular space passage portion 54 is formed between the inner cylinder 53 and the outer cylinder 52. The outer cylinder 52 is a hollow cylinder and is made of a conductive material such as SUS. Moreover, the inner cylinder 53 is also a hollow cylinder and is made of an insulating material such as Teflon ("Teflon" is the trademark for polytetrafluoroethylene), glass or ceramics. The inner cylinder 53 and the outer cylinder 52 are coaxially arranged. Further, the width ($\Delta R = R - r$) of the annular transversal section of the annular space passage portion 54, the outside diameter r of the inner cylinder 53 and the inside diameter R of the outer cylinder 52 are constant in the longitudinal direction of the gas decomposition unit.

Figure 9:
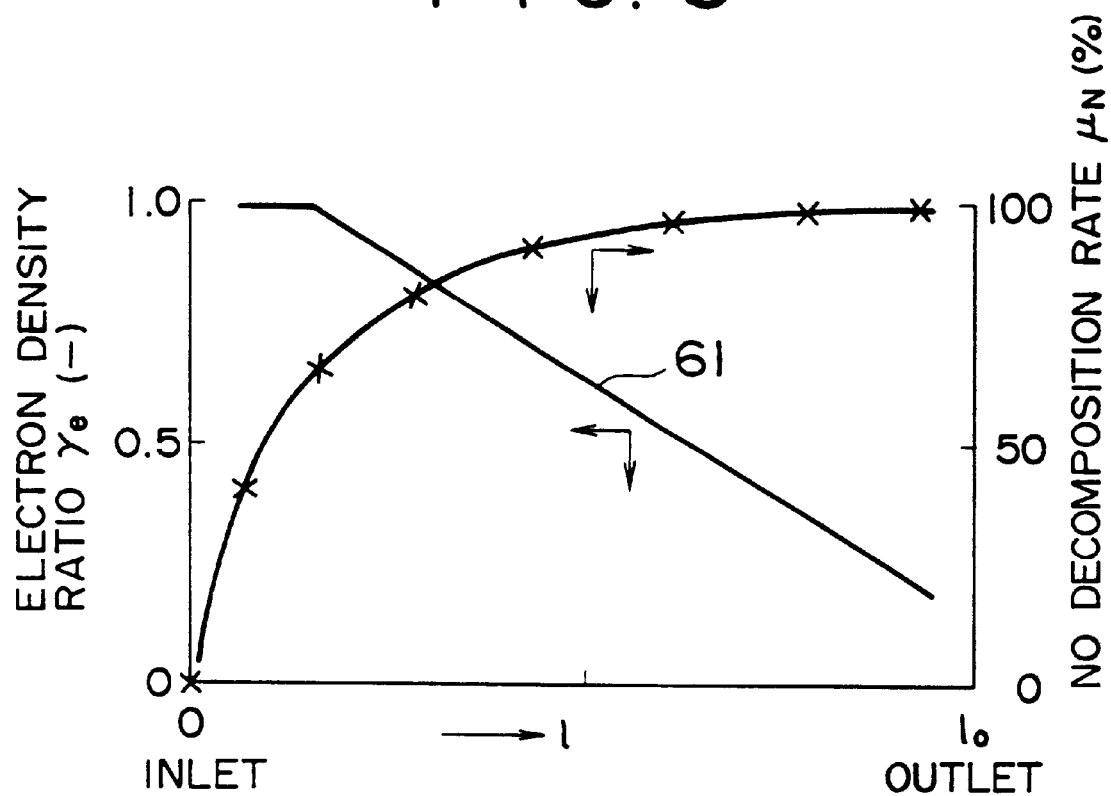
FIG. 9 is a graph illustrating the relation between the electron density and the NO decomposition rate (namely, the rate of decomposition of NO) in this embodiment of the present invention.

The "density" of the number of turns (namely, the wire density) of the coil 51 is set in such a manner that the wire density is high in a front-side (or upstream-side) portion of the gas decomposition unit and that the wire density is low in a rear-side (or downstream-side) portion thereof. Such setting of the high and low values of the wire density of the coil 51 is performed so that the high-energy-electron generation rate changes correspondingly to the concentration (or the number of molecules) of $NO_x$ or $SO_x$. Thereby, the gas decomposition unit is constructed so that the electron density is high in a front-side (or upstream-side) portion of the gas decomposition unit and that the electron density is low in a rear-side (or downstream-side) portion thereof. Here, note that the expression "change(s) correspondingly to" means in general that, for instance, the electron density changes along a curve 61 as illustrated in FIG. 9 (to be described later). Usually, several tens or hundreds of single gas-decomposition units (or cylinders), each of which is several tens centimeters (cm) in diameter and is five to ten meters (m) in length, are used in each plant. Further, it is usual that the total number of turns of the coil 51 ranges from several tens to hundreds in each single gas-decomposition unit.

In the case of this example of the configuration described herein-above, the exhaust gas containing the toxic ingredients such as $NO_x$ and $SO_x$ flows through the annular space passage portion 54 between the inner cylinder 53 and the outer cylinder 52. On the other hand, a high-voltage ultra-short pulse (for example, the pulse width thereof is 30 ns and the voltage thereof is 29 kV) is applied to the coil 51 from the power supply (not shown). As a result, a streamer discharge plasma is generated in the unit (or device). Consequently, a large number of high-energy electrons are generated. Thus, for instance, $NO_x$ is decomposed into $N_2$ and $O_2$. In addition, the unit is adapted so that the generation rate of high-energy electrons changes correspondingly to the concentration (thus, the number of molecules) of $NO_x$, $SO_x$ or the like. Thereby, excessive energy is prevented from being supplied to the gas decomposition unit.

FIFTH EXAMPLE OF EXHAUST GAS TREATMENT APPARATUS

Figure 8:
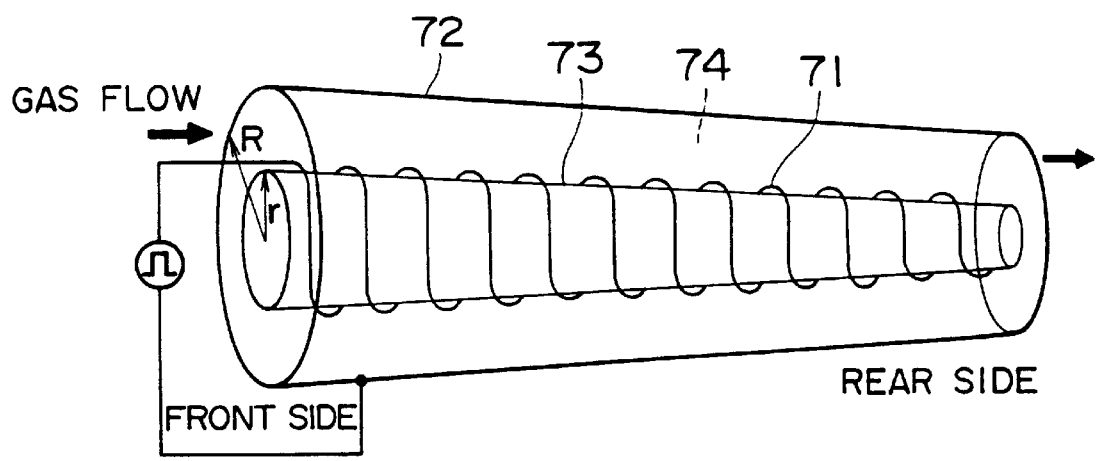
FIG. 8 is a perspective diagram illustrating the configuration of a fifth embodiment of the present invention.

FIG. 8 illustrates the configuration of a gas decomposition unit that is a primary part of a fifth example of the (streamer discharge plasma) exhaust gas treatment apparatus embodying the present invention. This gas decomposition unit is provided with an inner cylinder 73, around which a coil 71 is wound, and an outer cylinder 72. Further, an annular-space (tapered) passage portion 74 is formed between the inner cylinder 73 and the outer cylinder 72. The outer cylinder 72 is a hollow cylinder and is made of a conductive material such as SUS. Moreover, the inner cylinder 73 is also a hollow cylinder and is made of an insulating material such as Teflon, glass or ceramics. The inner cylinder 73 and the outer cylinder 72 are coaxially arranged. Furthermore, the width ($\Delta R = R - r$) of the annular transversal section of the annular space passage portion 74 is constant in the longitudinal direction of the gas decomposition unit, whereas the outside diameter r of the inner cylinder 73 and the inside diameter R of the outer cylinder 72 are set in such way as to decrease gradually and continuously toward the most downstream end portion. Meanwhile, the "density" of the number of turns (namely, the wire density) of the coil 71 is constant.

Thereby, the residence (or retention) time of the exhaust gas is (relatively) long in a portion at the side of the inlet (namely, at the front or upstream side) of the gas decomposition unit, while the residence time thereof is (relatively) short in a portion at the side of the outlet (namely, at the rear or downstream side) of the gas decomposition unit. Namely, the flow velocity of the exhaust gas is set so that the flow velocity is low in a portion at the front or upstream side of the gas decomposition unit and that the flow velocity is high in a portion at the rear or downstream side of the gas decomposition unit. Usually, several tens or hundreds of single gas-decomposition units (or cylinders), each of which is several tens centimeters (cm) in diameter and is five to ten meters (m) in length, are used in each plant. Moreover, it is usual that the total number of turns of the coil 71 ranges from several tens to hundreds in each single gas-decomposition unit.

Consequently, this example obtains advantages or effects equivalent to those obtained as a result of the fact that the electron density is (relatively) high in a front-side (or upstream-side) portion of the gas decomposition unit and that the electron density is (relatively) low in a rear-side (or downstream-side) portion thereof. Namely, the fifth example of the exhaust gas treatment apparatus obtains advantages or effects equivalent to those of the first example thereof. This is because the electron density (/$cm^3 \cdot sec$) corresponds to the number of electrons per unit volume of the exhaust gas and per unit time. Incidentally, the inside diameter R of the outer cylinder 72 and the outside diameter r of the inner cylinder 73 are set in such a manner as to be able to obtain such advantages or effects.

In the case of the fifth example of the configuration described herein-above, the exhaust gas containing the toxic ingredients such as $NO_x$ and $SO_x$ flows through the annular space passage portion 74 between the inner cylinder 73 and the outer cylinder 72. On the other hand, a high-voltage ultra-short pulse (for example, the pulse width thereof is 30 ns and the voltage thereof is 29 kV) is applied to the coil 71 from the power supply (not shown). As a consequence, a streamer discharge plasma is generated in the unit. Thereby, a large number of high-energy electrons are generated. Thus, for instance, $NO_x$ is decomposed into $N_2$ and $O_2$. In addition, the decomposition unit is adapted so that the generation rate of high-energy electrons changes correspondingly to the concentration (thus, the number of molecules) of $NO_x$, $SO_x$ or the like. Thereby, excessive energy is prevented from being supplied to the gas decomposition unit.

COMPARATIVE EXAMPLE AND FIRST AND SECOND WORKING EXAMPLES

The performance of each of the following comparative example and first and second exemplary examples is tested by letting an exhaust gas containing $NO_x$ which is 200 ppm in concentration, flow therethrough on the condition that the flow rate thereof at the inlet of the unit is 150 liters (1)/minutes (min).

The comparative example is the conventional apparatus adapted so that the number of turns of the coil is constant in the longitudinal direction of the gas decomposition unit and that the residence time of the gas is constant.

The first exemplary example corresponds to the aforementioned example illustrated in FIG. 7. Further, the wire density of the coil 51 is set so that such a wire density is high in a front-side portion of the decomposition unit and is low in a rear-side portion of the unit, with intention of realizing the condition that the electron density decreases along a straight line 61 of FIG. 9.

The second exemplary example corresponds to the aforesaid example shown in FIG. 8. This example of the apparatus is set in such a manner that the width $\Delta R$ (=R−r) of the annular space passage portion 74 is constant in the longitudinal direction of the gas decomposition unit and that the inside diameter R of the outer cylinder 72 and the outside diameter r of the inner cylinder 73 continuously and gradually decrease toward the downstream end portion. Thereby, this example of the apparatus is set so that the electron density decreases along the straight line 61 of FIG. 9, similarly as in the case of the first exemplary example.

Incidentally, as is apparent from FIG. 9, generally, the decomposition rate $\zeta_N$ is close to 70% at a place which is located at a distance of about (⅓) the length of the gas decomposition unit. Further, it is found that thence, the decomposition rate gradually (or slowly) progresses.

In TABLE 2 listed below, the ratio of the power consumption of each of the first and second exemplary examples to the power consumption of the comparative example (namely, the conventional apparatus or method) is described correspondingly to each value of the NO decomposition rate. The high voltage (namely, 20 kV) represented by the ultra-short voltage pulse (incidentally, the pulse width is 30 ns) is applied across each of the coils 51 and 71. In the case of the first and second working examples of the present invention, the power consumption is not more than that of the case of the comparative example. Thus, it is confirmed that the working examples of the present invention have advantages in considerably saving the power over the conventional apparatus or method.

Incidentally, in the case of the first and second working examples of the present invention, the test is performed by using a small-sized single unit or cylinder, which is 96 mm in diameter and is 3.5 in length. The total number of turns of the coil is 350.

TABLE 2

| | CONVENTIONAL METHOD | FIRST WORKING EXAMPLE OF THE PRESENT INVENTION | SECOND WORKING EXAMPLE OF THE PRESENT INVENTION |
|---|---|---|---|
| 80% of NO is decomposed | 1.00 | 0.49 | 0.50 |
| 90% of NO is decomposed | 1.00 | 0.43 | 0.42 |
| 95% of NO is decomposed | 1.00 | 0.38 | 0.39 |

As is obvious from the foregoing description, in accordance with the present invention, in the gas decomposition unit, the generation rate of high-energy electrons is changed in such a manner as to change correspondingly to (namely, in proportion to) the concentration (namely, the number of molecules) of the toxic substance $NO_x$ or $SO_x$. Thereby, the power consumption in the rear-side or downstream-side portion of the gas decomposition unit is considerably decreased. Moreover, in the front-side or upstream-side portion thereof, the electron density is sufficient to achieve the decomposition of the toxic substance. Thus, the gas-decomposition performance is not deteriorated. Consequently, the energy consumption of the entire apparatus can be considerably saved.

FIRST EXAMPLE OF PULSE GENERATOR

Figure 10:
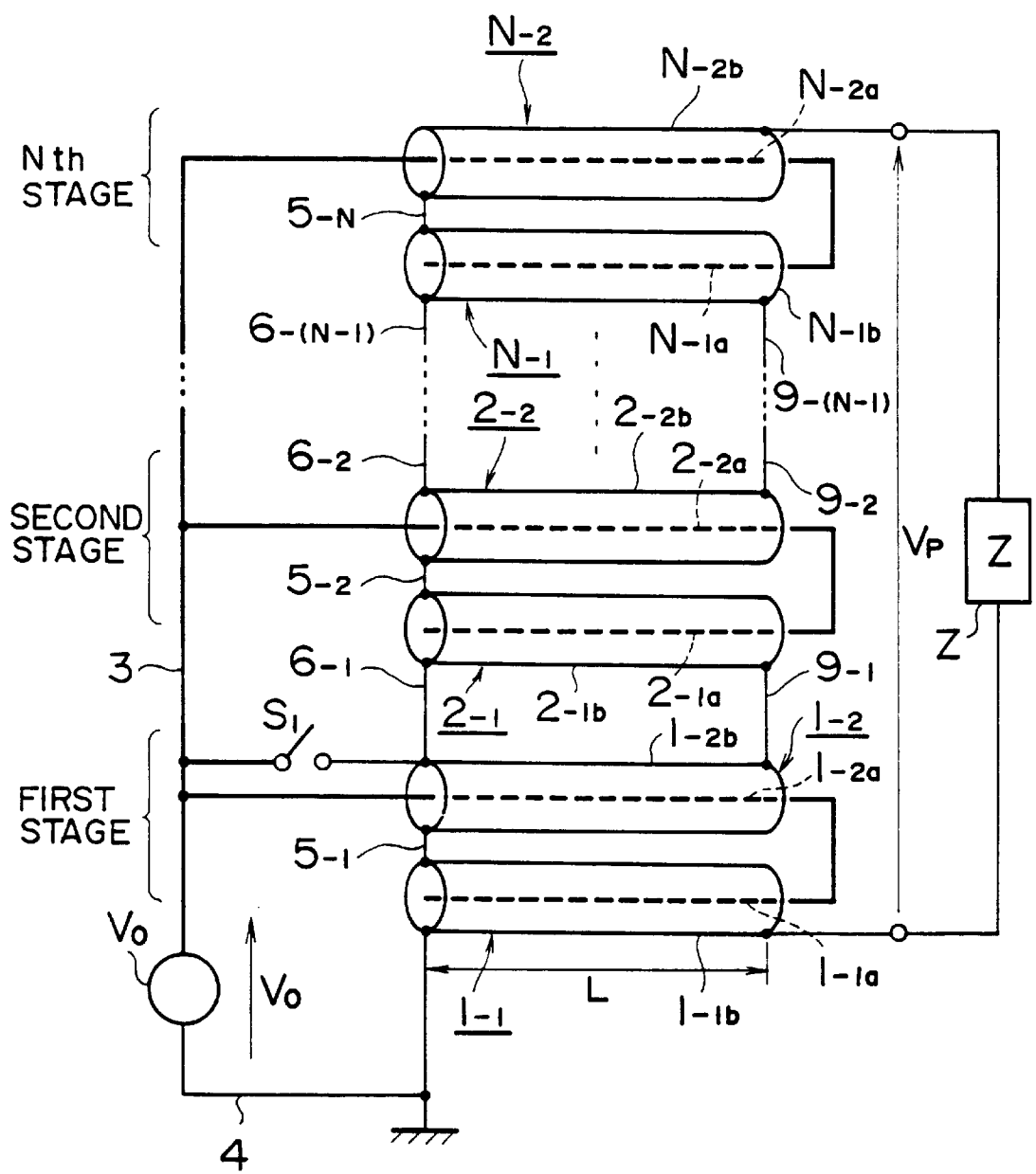
FIG. 10 is a diagram conceptually illustrating a first example of a pulse generator of the present invention.
Figure 11:
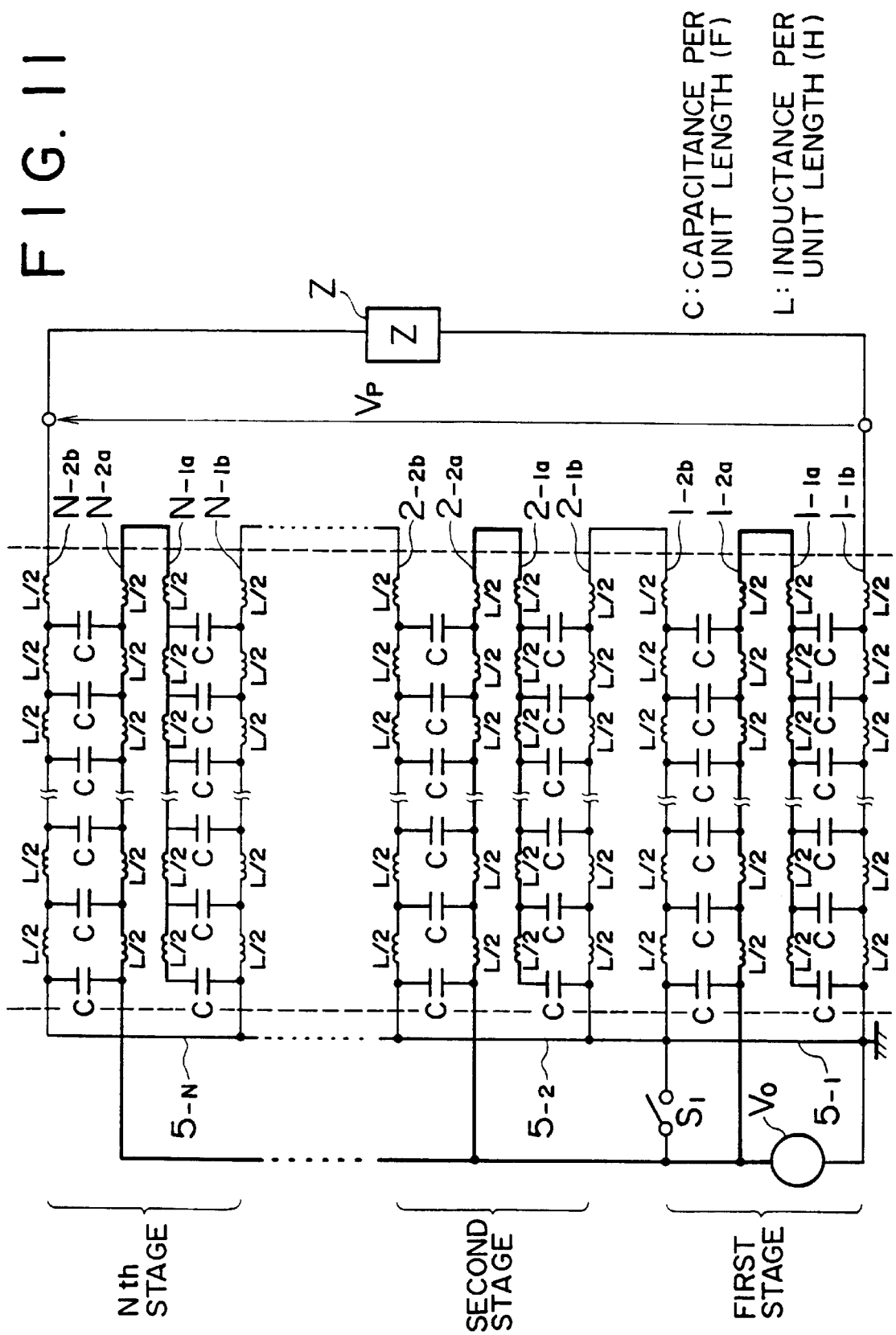
FIG. 11 is a circuit diagram illustrating an equivalent circuit of the pulse generator of FIG. 10.
Figure 19:
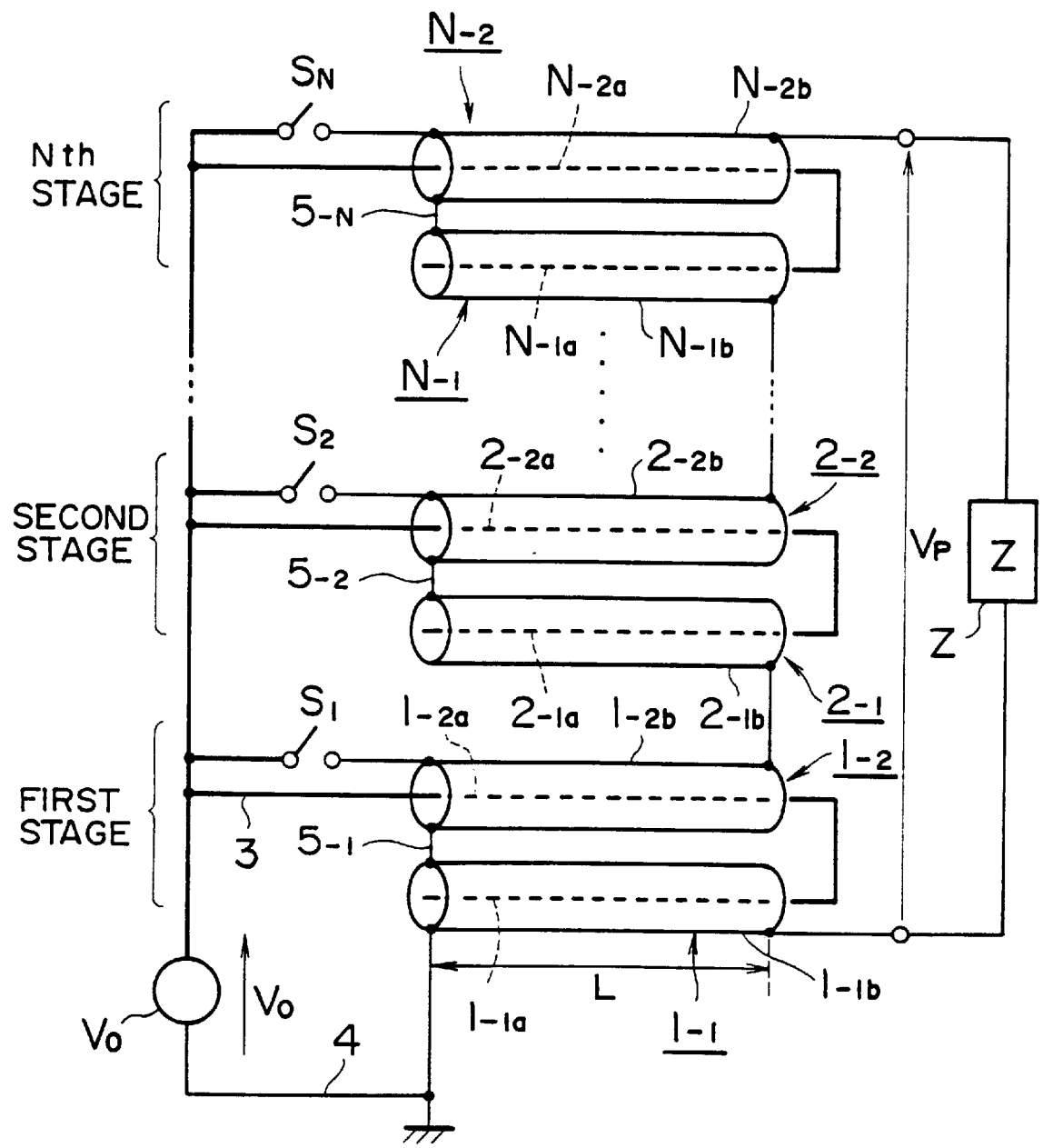
FIG. 19 is a diagram conceptually illustrating the configuration of the pulse generator adapted to have large capacitance by stacking multiple stages of the pulse generators, each of which is illustrated in FIG. 17.
Figure 20:
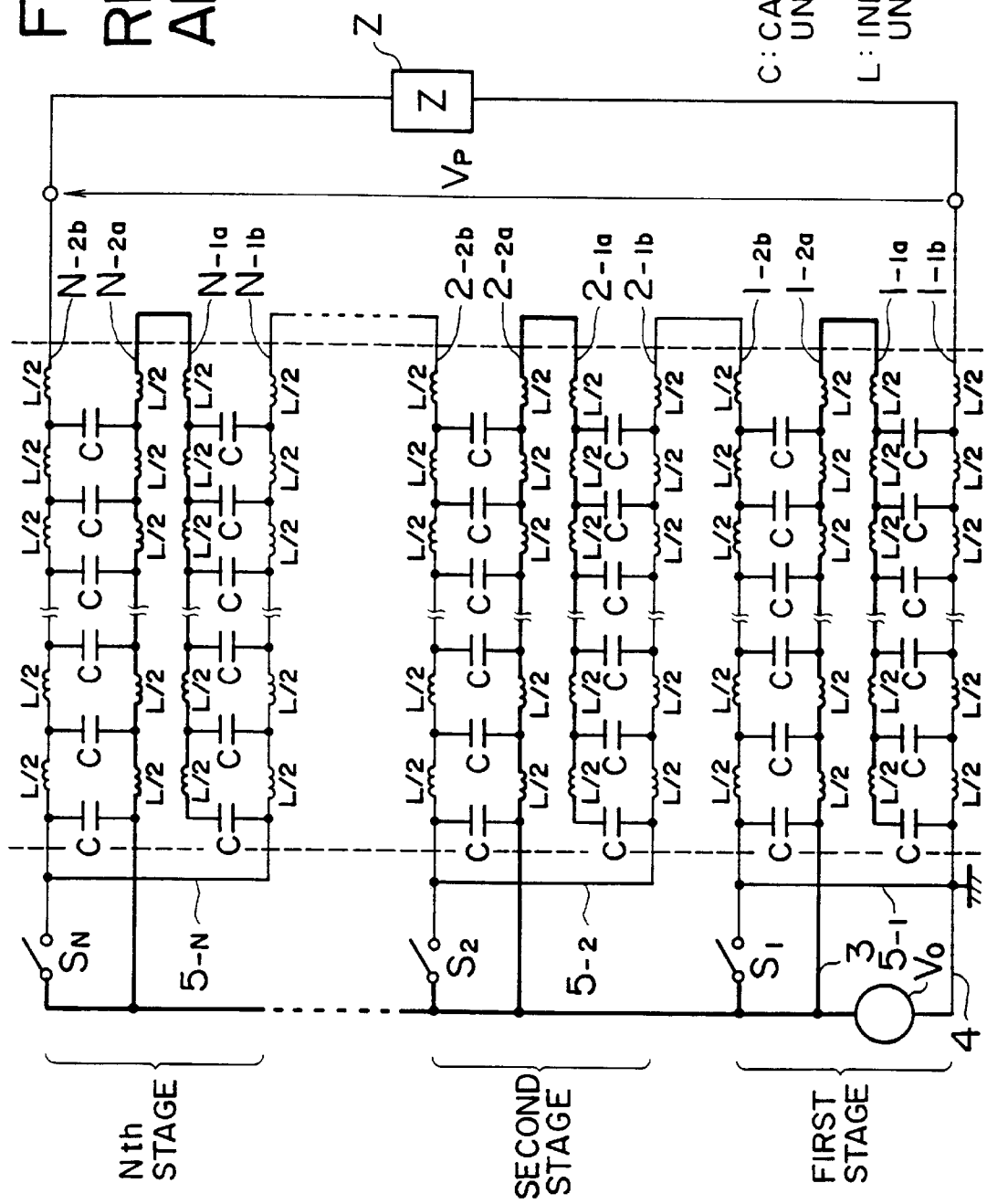
FIG. 20 is a circuit diagram showing the configuration of an equivalent circuit of the pulse generator of FIG. 19.
Figure 21:
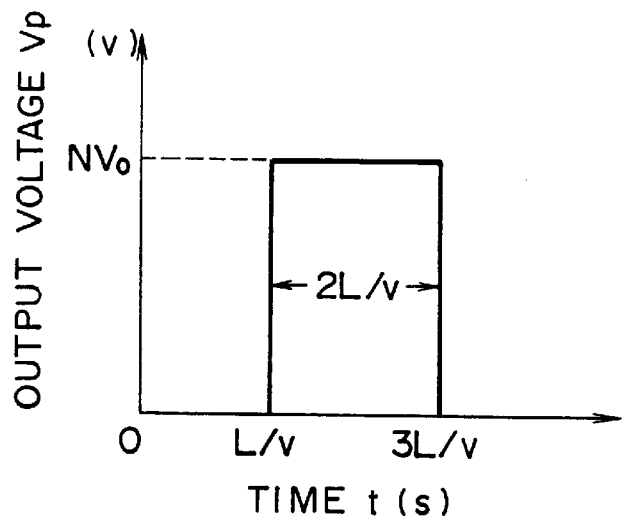
FIG. 21 is a waveform chart showing the ideal output waveform of the pulse generators of FIGS. 19 and 23.

Further, FIG. 10 is a diagram conceptually illustrating a first example of a pulse generator of the present invention. Moreover, FIG. 11 is a circuit diagram illustrating an equivalent circuit of the pulse generator of FIG. 10. This example is obtained by improving the pulse generator of FIG. 19. Thus, same reference numerals denote same portions of FIG. 19. The redundant description of such portions is omitted herein.

As illustrated in FIG. 10, only one shortcircuit switch $S_1$ is provided between a D.C. charger $V_0$ and the input terminal part of an outer conductor $1_{-2b}$ of a distributed constant line $1_{-2}$ of a first stage. Input terminal parts of outer conductors $(1_{-2b}, 2_{-2a})$, $(2_{-2b}, \ldots, N_{-2a})$ of each stage are connected with each other by means of grounding lines $6_{-1}$, $6_{-2}, \ldots, 6_{-(N-1)}$. Consequently, the outer conductors $1_{-1b}$, $1_{-2b}, 2_{-1b}, 2_{-2b}, \ldots, N_{-1b}, N_{-2b}$ are at the ground potential.

Here, note that all of the stages from the bottom or first stage to the top or Nth stage use distributed constant lines $1_{-1}, 1_{-2}, 2_{-1}, 2_{-2}, \ldots, N_{-1}, N_{-2}$, each of which has same characteristic impedance and same length. Moreover, the impedance of a load Z is matched to that of the power source or supply.

Figure 12:
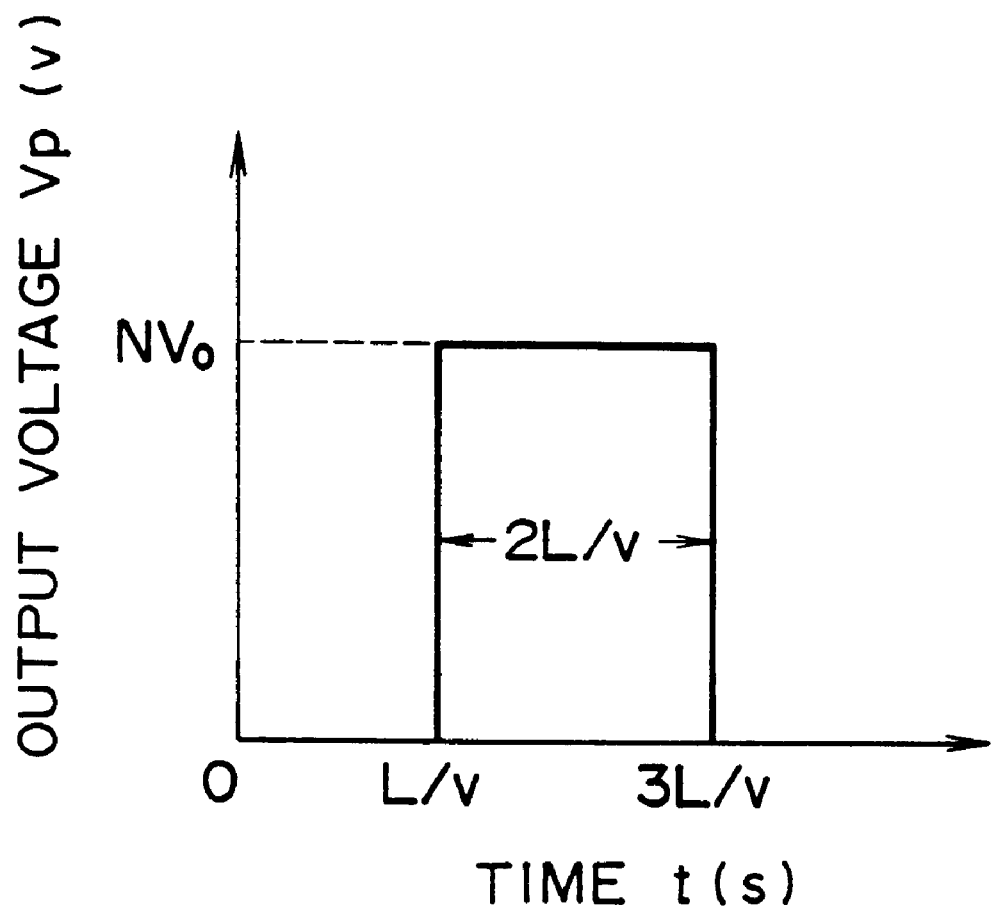
FIG. 12 is a waveform chart showing an output voltage waveform of the pulse generators of FIGS. 10 and 14.

In such a pulse generator, the shortcircuit switch $S_1$ is released in the initial condition. Further, a high-voltage side wiring line 3 indicated by a thick line is charged by means of the D.C. charger $V_0$ to the voltage $V_0$. Upon completion of the charging, if the shortcircuit switch $S_1$ is turned on at a moment t=0, a voltage pulse, which has a pulse width of (2L/v) and a peak voltage of $V_0$ (incidentally, the principle of this operation has been described previously), is generated in each of the pairs of the distributed constant lines $(1_{-1}, 1_{-2})$, $(2_{-1}, 2_{-2}), \ldots, (N_{-1}, N_{-2})$. As a result of superposition of these voltage pulses, a voltage, which is N times the voltage $V_p$, is applied to the load Z as illustrated in FIG. 12.

Therefore, a pulse, which has the peak voltage of $NV_0$ and further has the pulse width of (2L/v), is supplied to the load Z. Thereafter, when the shortcircuit switch $S_1$ is turned off, the apparatus is once again in the initial condition. Then, the aforementioned process is repeatedly performed.

SECOND EXAMPLE OF PULSE GENERATOR

Figure 13A:
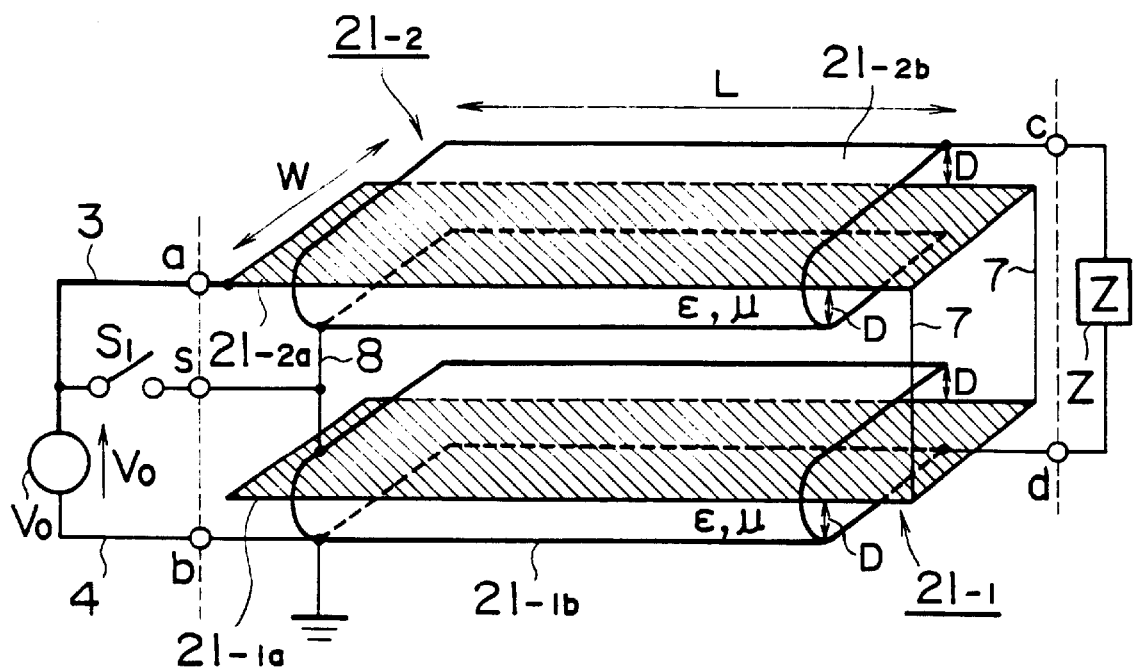
FIG. 13($a$) is a diagram conceptually illustrating one component unit in a second example of the pulse generator of the present invention.
Figure 13B:
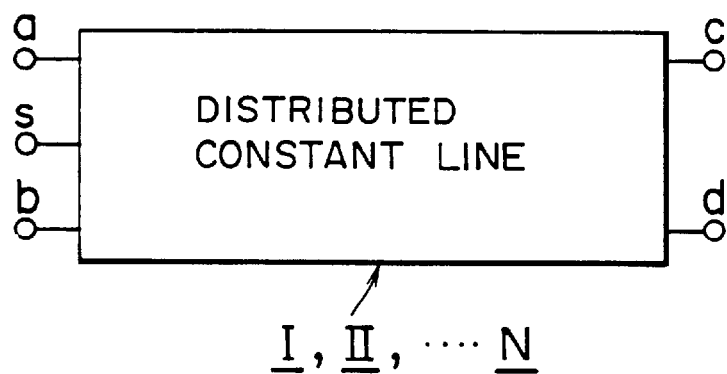
Figure 14:
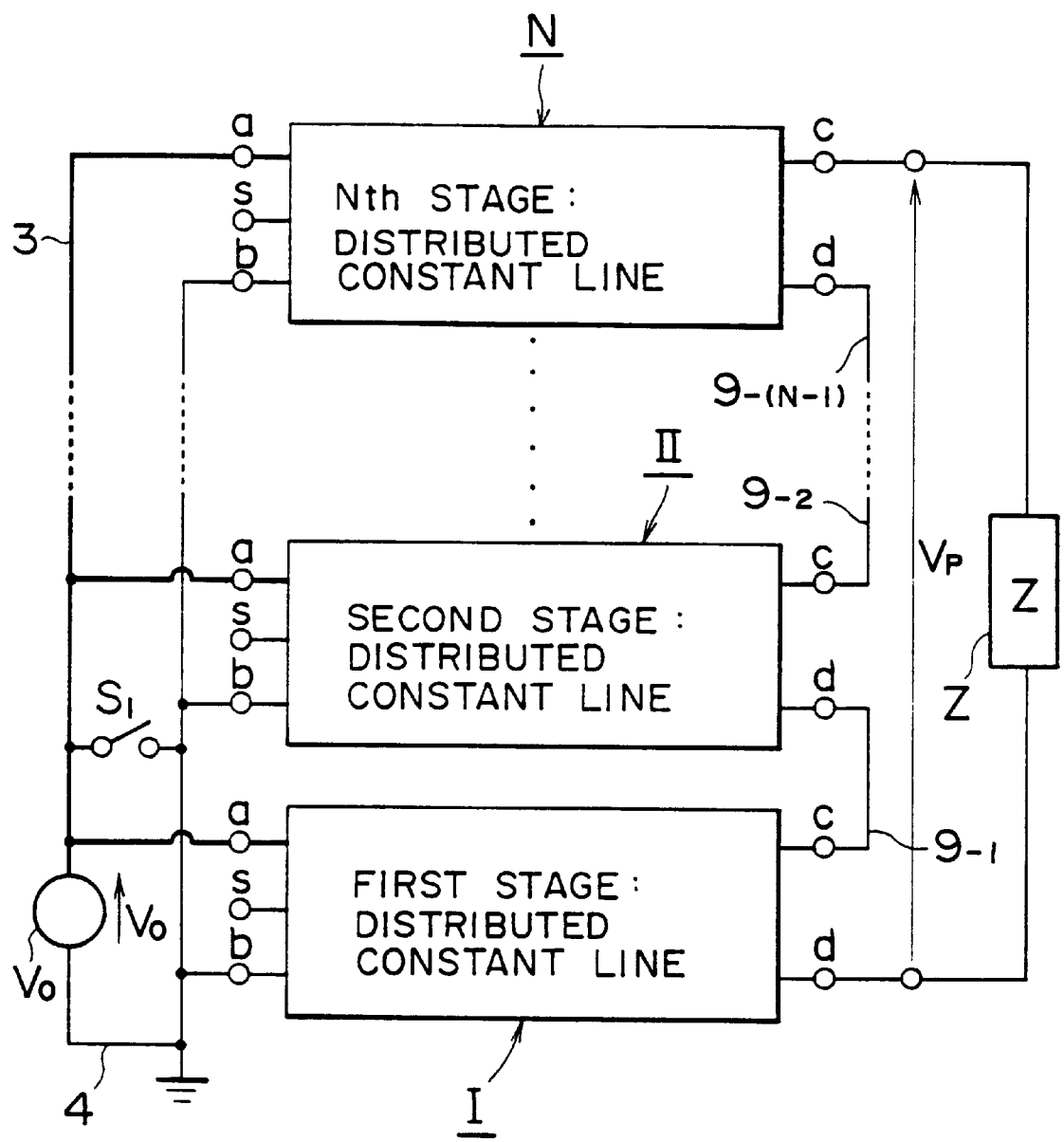
FIG. 14 is a diagram conceptually illustrating the entire configuration of the second example of the pulse generator of the present invention.
Figure 15:
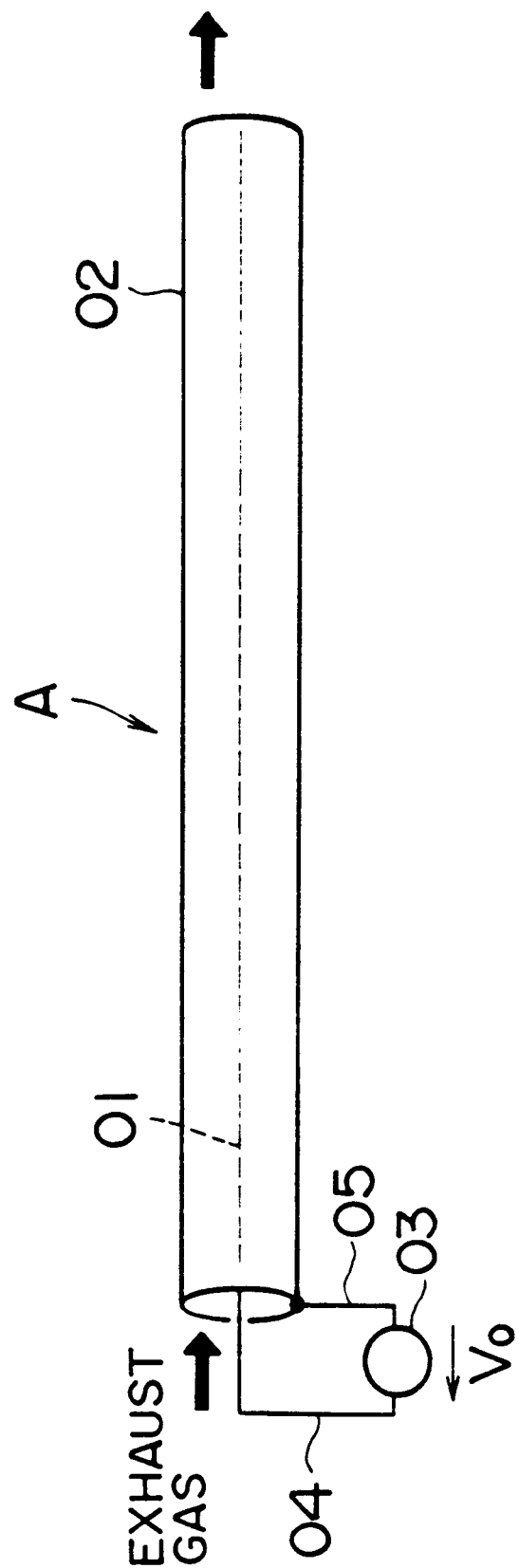
FIG. 15 is a diagram illustrating the configuration of the line-pair cylindrical reactor chamber of the conventional exhaust gas treatment reactor.
Figure 16:
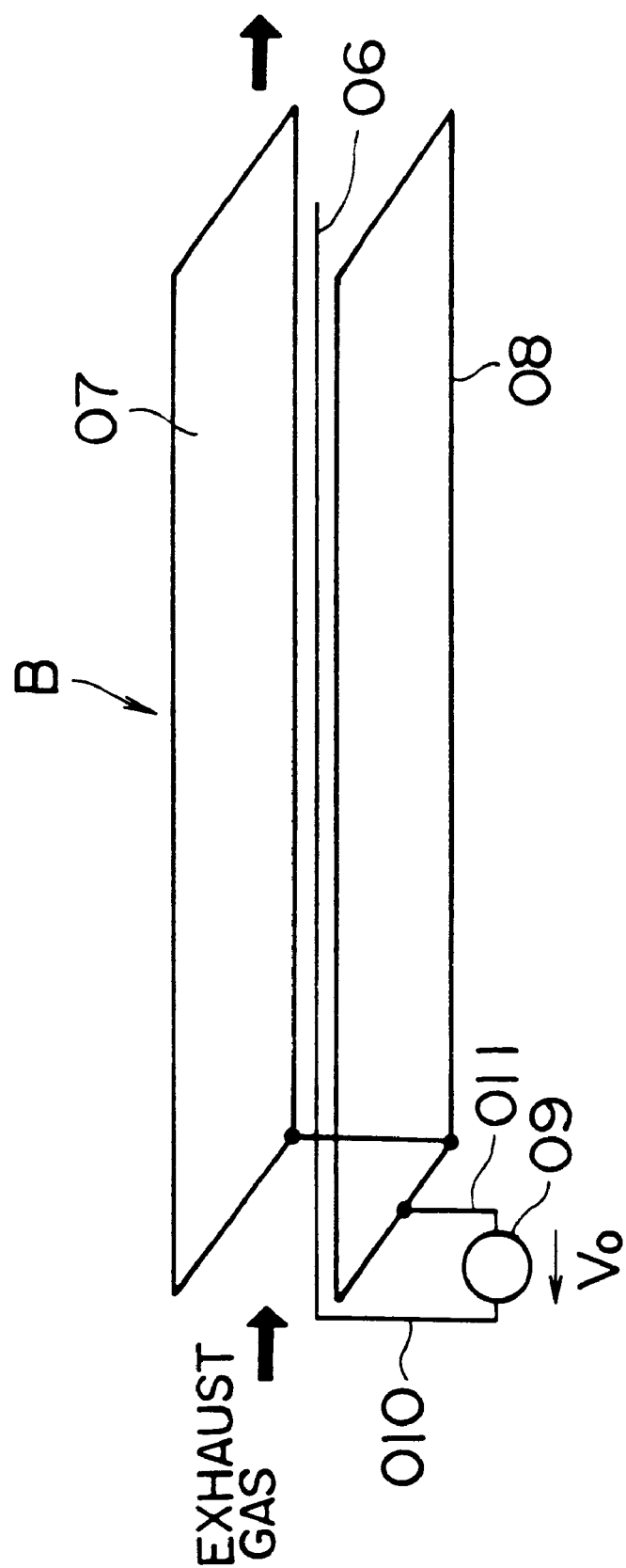
FIG. 16 is a diagram illustrating the configuration of the line-pair flat-plate reactor chamber of the conventional exhaust gas treatment reactor.
Figure 17:
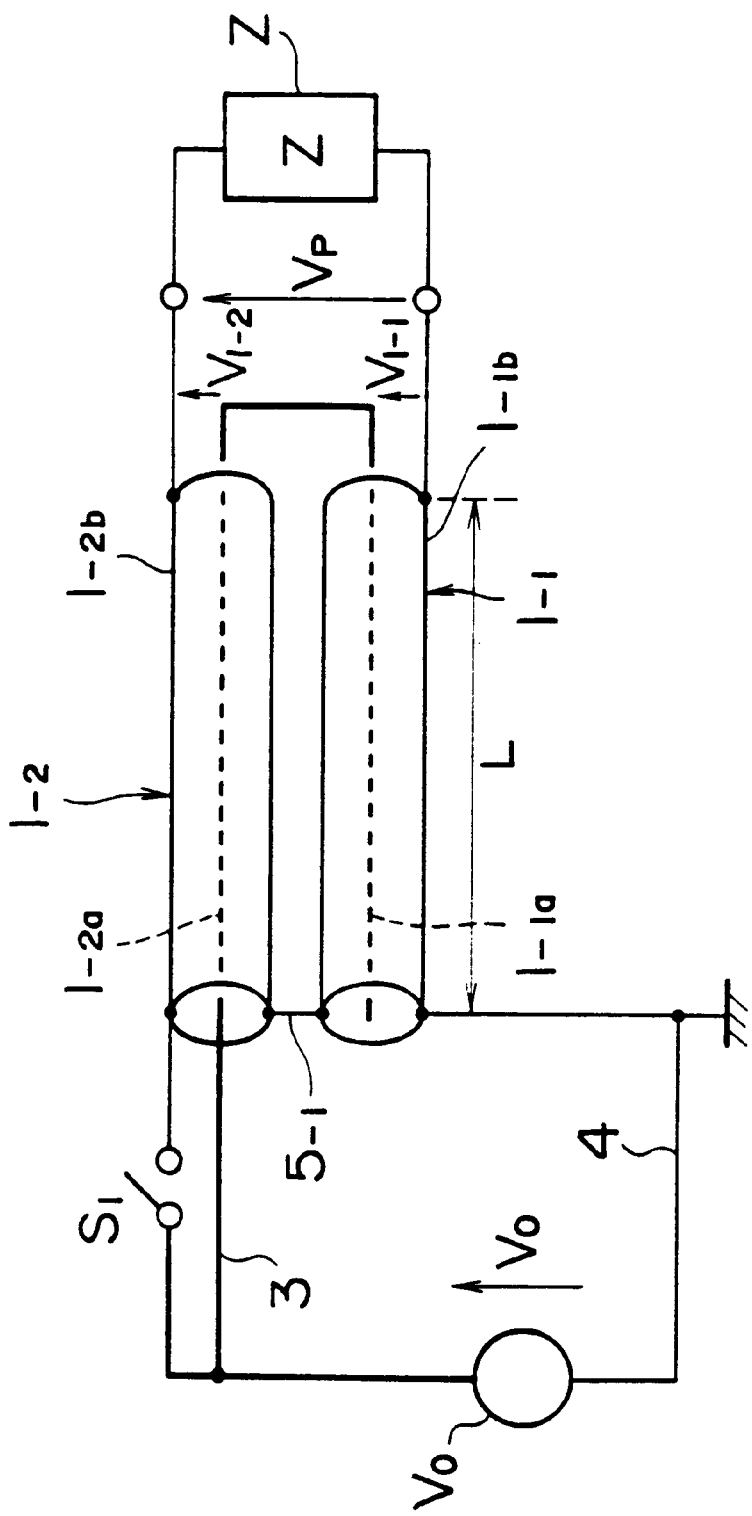
FIG. 17 is a diagram conceptually illustrating the configuration of the conventional pulse generator of the distributed constant type using the coaxial cables.

FIGS. 13(a), 13(b) and 14 are diagrams conceptually illustrating a second example of the pulse generator of the present invention. This example is obtained by improving the pulse generator of FIG. 12. Thus, same reference numerals denote same portions of FIG. 12. The redundant description of such portions is omitted herein.

FIG. 13(a) is a diagram for extracting and conceptually illustrating a pulse generating unit serving as a first stage of this second example. As illustrated in this figure, this pulse generating unit has distributed constant lines $21_{-1}$ and $21_{-2}$. These distributed constant lines $21_{-1}$ and $21_{-2}$ have flat plates $21_{-1b}$ and $21_{-2b}$, which are folded back like a letter "U", and flat plates $21_{-1a}$ and $21_{-2a}$, which are inserted into the flat plates $21_{-1b}$ and $21_{-2b}$ folded back like a letter "U", respectively. Additionally, dielectric insulating materials, which have same dielectric constant $\in$, same magnetic permeability $\mu$ and same thickness D, are disposed between the flat plates $21_{-1a}$ and $21_{-1b}$ and between the flat plates $21_{-2a}$ and $21_{-2b}$.

Output terminal parts of the flat plates $21_{-1a}$ and $21_{-2a}$ are connected to each other by a shortcircuit line 7. Moreover, the input terminal part of the flat plate $21_{-1b}$ is connected to a high-voltage-side wiring line 3. Furthermore, the input terminal parts of the flat plates $21_{-1b}$ and $21_{-2b}$ are connected to each other by a shortcircuit line 8 and are further grounded.

This example of the pulse generator is configured by stacking the component units, each of which is composed of the distributed constant lines $21_{-1}$ and $21_{-2}$, as multiple stages. Therefore, this example is represented by a block as shown in FIG. 13(b). In the following description, distribution constant lines I, II, . . . , N are assumed to be represented by this block.

Further, characters "I", "II" and N designate the distributed constant line of the first stage, the distributed constant line of the second stage and the distributed constant line of the Nth stage, respectively. In FIG. 13(b), terminals a, b, c, d and s correspond to the terminals a, b, c, d and s of FIG. 13(a), respectively. Therefore, in the case of the distributed constant line of the first stage, the terminal s is connected to the high-voltage-side wiring line 3. Similarly, the terminal b is connected to the low-voltage-side wiring line 4. Further, the terminals c and d are connected with each other. Furthermore, the terminal s is connected to the high-voltage-side wiring line 3 through the shortcircuit switch $S_1$.

Moreover, at that time, the terminal a is connected to the input(-side) terminal part of the flat plate $21_{-2a}$. The terminal b is connected to the input(-side) terminal part of the flat plate $21_{-1b}$. Furthermore, the terminal c is connected to the output(-side) terminal part of the flat plate $21_{-2b}$. The terminal d is connected to the output(-side) terminal part of the flat plate $21_{-1b}$. Additionally, the terminal s is connected to the shortcircuit line 8. Thus, in a charging state in which the shortcircuit switch $S_1$ is released, the flat plates $21_{-1a}$ and $21_{-2a}$ are at a high electric potential, whereas the flat plates $21_{-1b}$ and $21_{-2b}$ are at the ground potential.

FIG. 14 illustrates a pulse generator of this example, which is configured by stacking the blocks illustrated in FIG. 13(b). In FIG. 14, same reference numerals denote same portions of FIG. 10. The redundant description of such portions is omitted herein.

As illustrated in FIG. 14, the terminals a of the distributed constant lines I, II, . . . , N are connected with the high-voltage-side wiring line 3. Further, the terminals b thereof are connected to each other by the low-voltage-side wiring line 4. Furthermore, the single shortcircuit switch $S_1$ is connected between the high-voltage-side wiring line 3 and the low-voltage-side wiring line 4.

The terminal c of the lower one of two stages of each adjacent pair is connected to the terminal d of the upper one of the two stages by a corresponding one of connecting lines $9_{-1}, 9_{-2}, \ldots, 9_{-(N-1)}$ in sequence. Moreover, the load Z is connected between the terminal c of the top stage, namely, of the distributed constant line N and the terminal d of the bottom stage, namely, of the distributed constant line I. Furthermore, the terminal s is released or opened.

Here, note that all of the distributed constant lines I to N of the stages from the bottom or first stage to the top or Nth stage have same characteristic impedance and same length. Further, the impedance of the load Z is matched to that of a D.C. charger serving as the power supply.

In the case of such a pulse generator, in the initial condition, the shortcircuit switch $S_1$ is released. The high-voltage-side flat plates $21_{-1a}$ and $21_{-2a}$ are charged by means of the D.C. charger $V_0$ to the voltage $V_0$. Upon completion of the charging, if the shortcircuit switch $S_1$ is turned on at the moment t=0, voltage pulses generated in each of the distributed constant lines I to N are superposed. As a result, a voltage $V_p$ to be applied to the load Z becomes as illustrated in FIG. 12. Therefore, a pulse, which has the peak voltage of $NV_0$ and further has the pulse width of (2L/v), is supplied to the load Z, similarly as in the case of the aforementioned example. Thereafter, when the shortcircuit switch $S_1$ is turned off, the apparatus is once again put into the initial condition. Subsequently, the aforementioned process is repeatedly performed.

Incidentally, the capacitance of each component unit is increased by increasing the areas of the high-voltage-side flat plates $21_{-1a}$ and $21_{-2a}$ and the low-voltage-side flat plates $21_{-1b}$ and $21_{-2b}$ and by narrowing the gap between the flat plates or by using a dielectric substance, which has a high-dielectric-constant, as the insulating material interposed between the flat plates. Consequently, the capacitance of the entire pulse generator can be increased.

Figure 22:
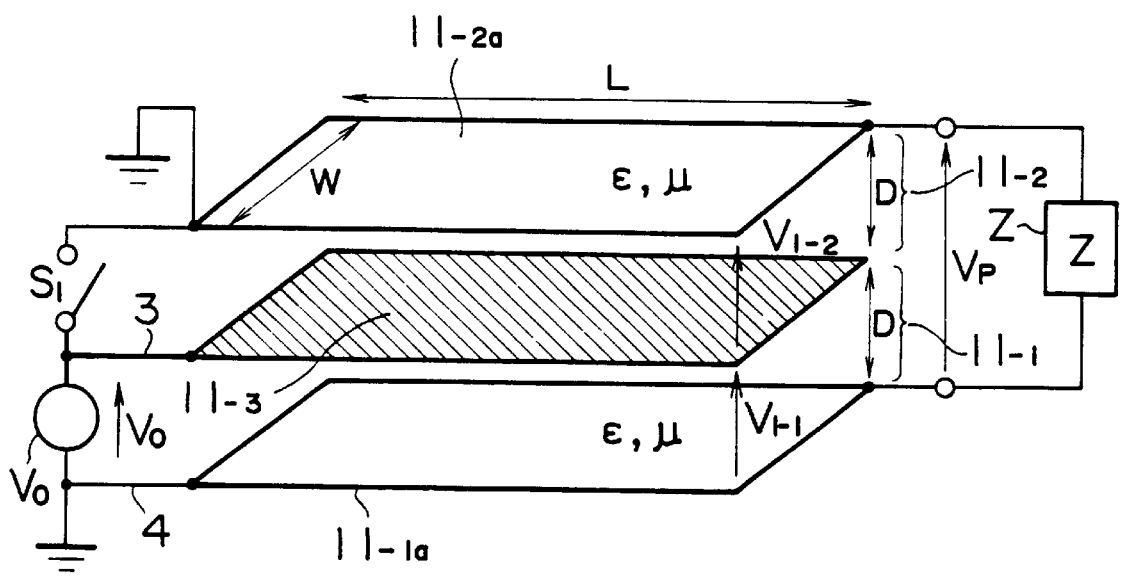
FIG. 22 is a diagram conceptually illustrating the configuration of the conventional pulse generator of the distributed constant type using the parallel flat plates.
Figure 23:
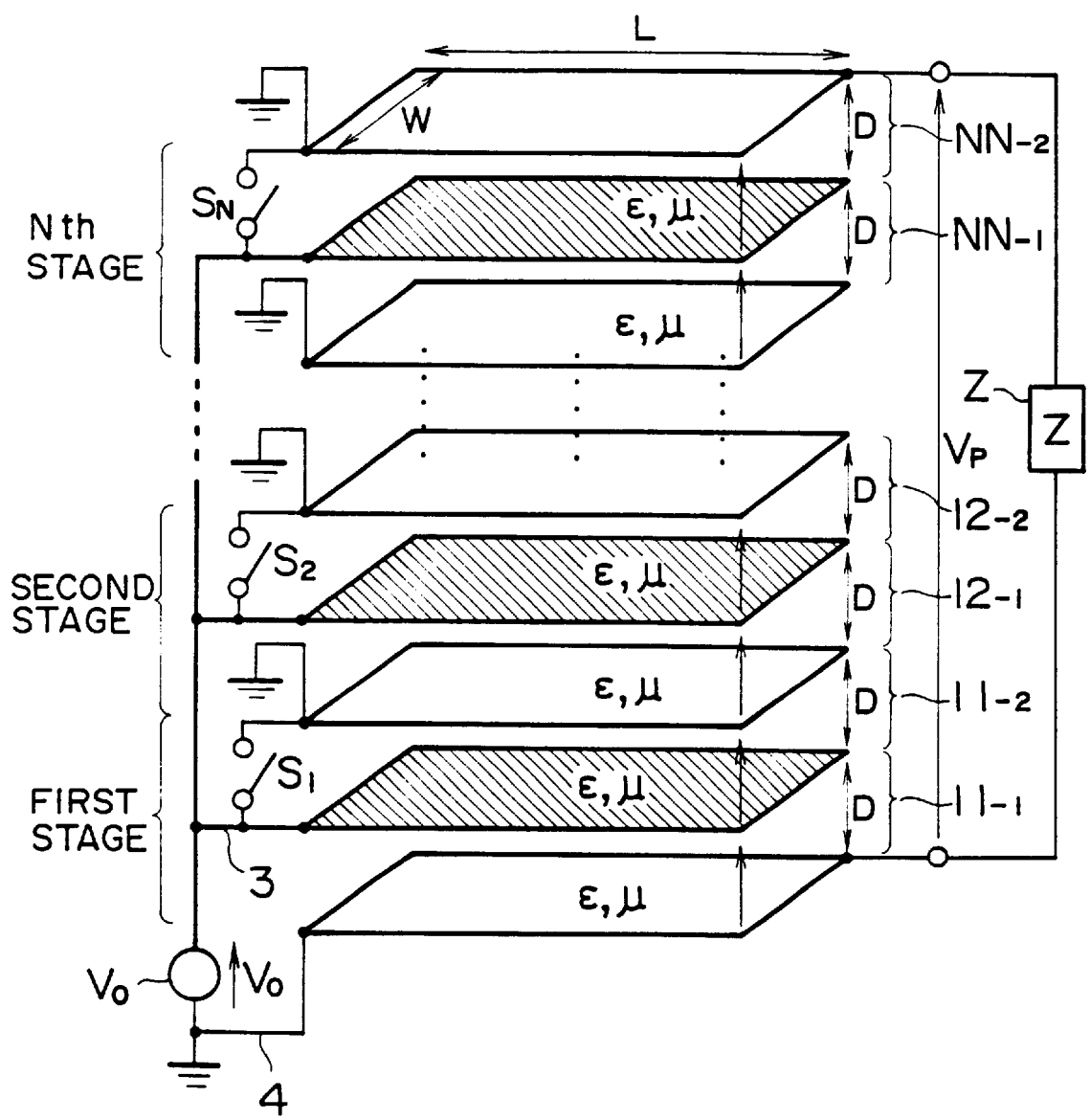
FIG. 23 is a diagram conceptually illustrating the configuration of the pulse generator adapted to have large capacitance by stacking multiple stages of the pulse generators, each of which is illustrated in FIG. 22.
Figure 24:
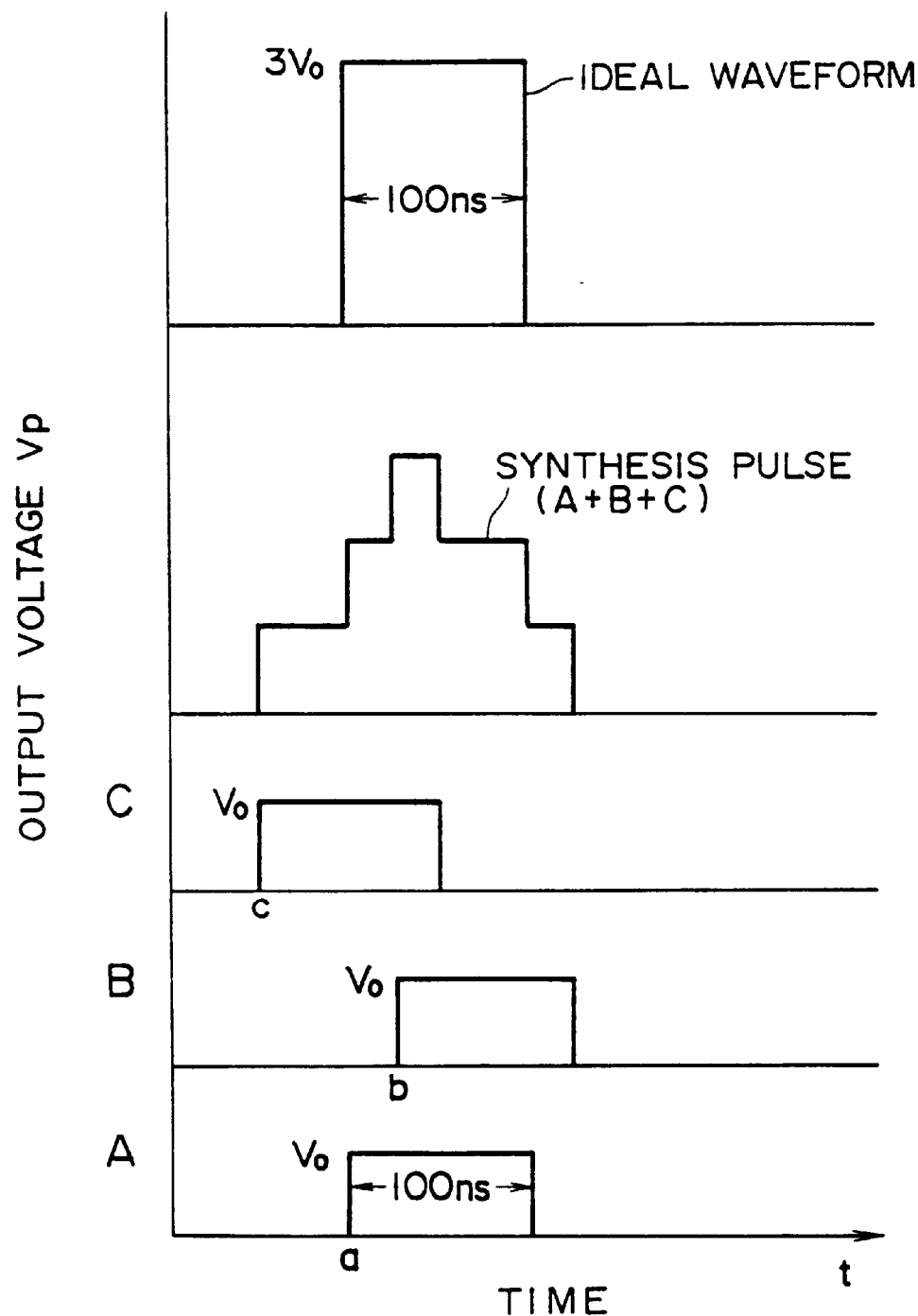
FIG. 24 is a waveform chart showing the actual output waveform of the pulse generators of FIGS. 19 and 23.

Further, in the case of the example described hereinabove, each of the component units of the distributed constant lines I to N is configured by the distributed constant lines $21_{-1}$ and $21_{-2}$. However, each of the component units is not limited to the distributed constant lines $21_{-1}$ and $21_{-2}$. For example, if each of the component units consists of the distributed constant lines $11_{-1}$ and $11_{-2}$ of FIG. 22, same advantages or effects are obtained. At that time, the terminals a of FIGS. 13(a) and 13(b) are connected to the flat plate $11_{-3}$. Further, it is assumed that thence, similarly, the terminal b is connected to the terminal part, which is located at the side of the D.C. charger $V_0$, of the flat plate $1_{11-1a}$. Moreover, the terminal c is connected to the opposite-side terminal part, which is located at a side opposite to the D.C. charger $V_0$, of the flat plate $11_{-1a}$. Furthermore, the terminal c is connected to the opposite-side terminal part, which is located at a side opposite to the D.C. charger $V_0$, of the flat plate $11_{-1b}$.

As concretely described in the foregoing description of the examples or embodiments of the present invention, in the case of the apparatus or method of the present invention, a high voltage, which is an output voltage of the D.C. charger $V_0$, is simultaneously applied to a plurality of distributed constant lines $1_{-1}, 1_{-2}, 2_{-1}, 2_{-2}, \ldots, N_{-1}$ and $N_{-2}$ connected in parallel by the single shortcircuit switch $S_1$. This circuit utilizes the difference in the propagation (delay) time among the distributed constant lines $1_{-1}, 1_{-2}, 2_{-1}, 2_{-2}, \ldots, N_{-1}$ and $N_{-2}$. As a result of grounding the outer conductors $1_{-1b}, 1_{-2b}, 2_{-1b}, 2_{-2b}, \ldots, N_{-1b}$ and $N_{-2b}$, which are at the side of the switch $S_1$, of the distributed constant lines $1_{-1}, 1_{-2}, 2_{-1}, 2_{-2}, \ldots, N_{-1}$ and $N_{-2}$, these outer conductors can be simultaneously shortcircuited by the high-voltage-side wiring line 3, which is indicated by the thick line, and the single shortcircuit switch $S_1$.

With such a configuration, the single shortcircuit switch $S_1$ suffices. This eliminates the possibility of an occurrence of the problem in that the shortcircuit switch $S_1$ performs the turning-on operation in inexact timing (namely, in imperfect synchronization) with those of the other switches, similarly as in tire case of the conventional apparatus. Thus, a reduction in the output voltage can be prevented. Therefore, the pulse generator of the present invention can be operated by using a single shortcircuit switch. Consequently, the present invention eliminates the problems of the conventional apparatus, namely, that the turning-on operations of a plurality of shortcircuit switches are performed in inexact timing with one another and that thus the output voltage drops. Moreover, in accordance with the present invention, desired or ideal large voltage pulses can be obtained.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A method of treating exhaust gas, comprising detoxifying a toxic component contained in said exhaust gas by supplying energy to a reactor chamber to thereby generate a streamer discharge plasma, and then flowing the exhaust gas through said reactor chamber to thereby decompose the toxic component, wherein said method comprises preliminarily connecting a plurality of stages of reactor chambers in series in a direction in which an exhaust gas flows; and setting energy to be supplied to each of said reactor chambers in such a manner that as a reactor chamber to be supplied with energy becomes closer to a most downstream reactor chamber, energy to be supplied thereto is gradually decreased.

2. The method according to claim 1, wherein, in the step of preliminarily connecting a plurality of stages of reactor chambers, the plurality of stages of reactor chambers are connected in a meander pattern or are coaxially arranged.

* * * * *